(12) United States Patent
Ball et al.

(10) Patent No.: US 11,130,129 B2
(45) Date of Patent: Sep. 28, 2021

(54) CHECK VALVES FOR MICROFLUIDIC SYSTEMS AND METHODS THEREOF

(71) Applicant: National Technology & Engineering Solutions of Sandia, LLC, Albuquerque, NM (US)

(72) Inventors: Cameron Scott Ball, Sunnyvale, CA (US); Ronald F. Renzi, Rexford, NY (US); Robert Meagher, Mountain House, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 82 days.

(21) Appl. No.: 16/597,292

(22) Filed: Oct. 9, 2019

(65) Prior Publication Data

US 2020/0038864 A1    Feb. 6, 2020

Related U.S. Application Data

(62) Division of application No. 15/447,581, filed on Mar. 2, 2017, now Pat. No. 10,478,818.

(60) Provisional application No. 62/312,947, filed on Mar. 24, 2016.

(51) Int. Cl.
*B01L 3/00* (2006.01)
*F16K 99/00* (2006.01)

(52) U.S. Cl.
CPC ..... *B01L 3/502738* (2013.01); *B01L 3/50273* (2013.01); *B01L 3/502707* (2013.01); *B01L 3/502715* (2013.01); *F16K 99/0015* (2013.01); *F16K 99/0057* (2013.01); *B01L 2200/10* (2013.01); *B01L 2200/12* (2013.01); *B01L 2300/049* (2013.01); *B01L 2300/0887* (2013.01); *B01L 2400/0487* (2013.01); *B01L 2400/0605* (2013.01)

(58) Field of Classification Search
CPC .. B01L 3/502738; B01L 3/5027; B01L 3/502; B01L 3/50; B01L 3/502723; F16K 99/0015; F16K 99/0003; F16K 99/0001; F16K 99/00
USPC .......................................... 422/503, 500, 50
See application file for complete search history.

(56) References Cited

U.S. PATENT DOCUMENTS

| | | |
|---|---|---|
| 5,583,478 A | 12/1996 | Renzi |
| 5,777,734 A | 7/1998 | Flower et al. |
| 6,084,205 A | 7/2000 | Sheaffer et al. |

(Continued)

OTHER PUBLICATIONS

Ball, Cameron & Priye, Aashish & Renzi, Ronald & Meagher, Robert. (Jan. 2016). A simple micro check valve for microfluidic point-of-care diagnostics. 10.13140/RG.2.1.3075.4323. (Year: 2016).*

(Continued)

*Primary Examiner* — Christine T Mui
(74) *Attorney, Agent, or Firm* — Helen S. Baca; Medley, Behrens, Lewis, LLC

(57) ABSTRACT

The present invention relates to microfluidic check valves, as well as fluidic cartridges including such check valves. In particular examples, the check valve includes a pre-stressed spring formed from a planar substrate. Various characteristics of the valves, such as size, profile, opening pressure, etc., can be tuned to provide desired performance when employed within a fluidic cartridge.

20 Claims, 20 Drawing Sheets

(56) References Cited

U.S. PATENT DOCUMENTS

| | | |
|---|---|---|
| 6,832,787 B1 | 12/2004 | Renzi |
| 6,918,573 B1 | 7/2005 | Renzi |
| 6,926,313 B1 | 8/2005 | Renzi |
| 6,966,336 B1 | 11/2005 | Renzi |
| 6,998,598 B2 | 2/2006 | Horn et al. |
| 7,182,371 B1 | 2/2007 | Renzi |
| 7,311,882 B1 | 12/2007 | Renzi |
| 7,351,380 B2 | 4/2008 | Simmons et al. |
| 7,452,507 B2 | 11/2008 | Renzi et al. |
| 7,553,455 B1 | 6/2009 | Renzi et al. |
| 7,592,139 B2 | 9/2009 | West et al. |
| 8,047,829 B1 | 11/2011 | Sommer et al. |
| 8,162,149 B1 | 4/2012 | Perroud et al. |
| 8,163,254 B1 | 4/2012 | Renzi et al. |
| 8,394,312 B1 | 3/2013 | Sommer et al. |
| 8,398,839 B1 | 3/2013 | Morales et al. |
| 8,426,135 B1 | 4/2013 | West et al. |
| 8,518,346 B1 | 8/2013 | Chirica et al. |
| 8,585,916 B2 | 11/2013 | Perroud et al. |
| 8,585,986 B1 | 11/2013 | Renzi |
| 8,808,588 B1 | 8/2014 | Simmons et al. |
| 8,828,736 B2 | 9/2014 | Perroud et al. |
| 8,912,502 B2 | 12/2014 | Derzon et al. |
| 8,940,147 B1 | 1/2015 | Bartsch et al. |
| 9,170,340 B1 | 10/2015 | Derzon et al. |
| 9,322,014 B1 | 4/2016 | VanderNoot et al. |
| 9,404,913 B2 | 8/2016 | Perroud et al. |
| 9,579,649 B2 | 2/2017 | Renzi et al. |
| 9,993,894 B1 | 6/2018 | Derzon et al. |
| 10,202,929 B1 | 2/2019 | Dec et al. |
| 2013/0068325 A1* | 3/2013 | Herz ................... F16K 99/0048 137/565.01 |
| 2015/0321193 A1* | 11/2015 | Sprague ................ F04B 19/006 422/505 |

OTHER PUBLICATIONS

U.S. Appl. No. 15/008,285, filed Jan. 27, 2016, Meagher et al.
U.S. Appl. No. 15/951,920, filed Apr. 12, 2018, Meagher et al.
U.S. Appl. No. 15/994,711, filed May 31, 2018, Bird et al.
Al-Faqheri W et al., "Development of novel passive checkvalves for the microfluidic CD platform," *Sens. Actuat. A* 2015;222:245-254.
Ball CS et al., "A simple check valve for microfluidic point of care diagnostics," *Lab Chip* 2016;16:4436-4444.
Ball CS et al., "A simple checkvalve for microfluidic point of care diagnostics," Jan. 2016, DOI:10.13140/RG.2.1.3075.4323 (1 p.).
Electronic Supplementary Material for Ball CS et al., "A simple check valve for microfluidic point of care diagnostics," *Lab Chip* 2016;16:4436-4444 (4 pp.).
Ball CS et al., "Quenching of unincorporated amplification signal reporters in reverse-transcription loop-mediated isothermal amplification enabling bright, single-step, closed-tube, and multiplexed detection of RNA viruses," *Anal. Chem.* 2016;88:3562-3568.
Becker H et al., "A multiport metering valve technology for on-chip valving," *16th International Conference on Miniaturized Systems for Chemistry and Life Sciences*, held on Oct. 28-Nov. 1, 2012 in Okinawa, Japan, pp. 308-310.
Chen HW et al., "The development of lyophilized loop-mediated isothermal amplification reagents for the detection of *Coxiella burnetii*," *J. Vis. Exp.* 2016; 110:e53839 (6 pp.).
Cheng CH et al., "Characteristic studies of the piezoelectrically actuated micropump with check valve," *Microsyst. Technol.* 2013;19:1707-1715.
Fong J et al., "Wireless implantable chip with integrated nitinol-based pump for radio-controlled local drug delivery," *Lab Chip* 2015;15:1050-1058.
Hayashida K et al., "Direct blood dry LAMP: a rapid, stable, and easy diagnostic tool for Human African Trypanosomiasis," *PLoS Negl. Trop. Dis.* 2015;9(3):e0003578 (14 pp.).
Hickerson AI et al., "Disposable miniature check valve design suitable for scalable manufacturing," *Sens. Actuat. A* 2013;203:76-81.
Li W et al., "Squeeze-chip: a finger-controlled microfluidic flow network device and its application to biochemical assays," *Lab Chip* 2012;12:1587-1590.
Nath P et al., "Polymerase chain reaction compatibility of adhesive transfer tape based microfluidic platforms," *Microsys. Technol.* 2014;20(6):1187-1193.
Nath P et al., "Rapid prototyping of robust and versatile microfluidic components using adhesive transfer tapes," *Lab Chip* 2010;10:2286-2291.
Nguyen NT et al., "Micro check valves for integration into polymeric microfluidic devices," *J. Micromech. Microeng.* 2004;14:69-75.
Parida M et al., "Real-time reverse transcription loop-mediated isothermal amplification for rapid detection of West Nile virus," *J. Clin. Microbiol.* 2004;42:257-263.
Smal O et al., "Modelling, characterization and testing of an ortho-planar micro-valve," *J. Micro-Nano Mech.* 2008;4:131-143.
Snakenborg D et al., "Polymer microvalve with pre-stressed membranes for tunable flow-pressure characteristics," *Microfluid. Nanofluid.* 2010;10:381-388.
Wheeler SS et al., "Surveillance of Western equine encephalitis, St. Louis encephalitis, and West Nile viruses using reverse transcription loop-mediated isothermal amplification," *PLoS One* 2016;11(1):e0147962 (17 pp.).
Xu K et al., "Simultaneous metering and dispensing of multiple reagents on a passively controlled microdevice solely by finger pressing," *Lab Chip* 2015;15:867-876.

* cited by examiner 0.20 mm PMMA  0.25 mm PET  0.13 mm PET

CHECK VALVES FOR MICROFLUIDIC SYSTEMS AND METHODS THEREOF

CROSS-REFERENCE TO RELATED APPLICATION

This application is a divisional of prior U.S. patent application Ser. No. 15/447,581, filed Mar. 2, 2017, now U.S. Pat. No. 10,478,818, which in turn claims the benefit of U.S. Provisional Application No. 62/312,947, filed Mar. 24, 2016, each which is hereby incorporated by reference in its entirety.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to microfluidic check valves, as well as fluidic cartridges including such check valves. In particular examples, the check valve includes a pre-stressed spring formed from a planar substrate.

BACKGROUND OF THE INVENTION

Point-of-care diagnostic devices require numerous on-chip structures to manipulate fluid and sample flow. At times, such structures require complex lithography to provide miniaturized components. Rapid prototyping (e.g., laser cutting) can greatly simplify manufacturing, but many component designs cannot be rapidly prototyped without losing function. Accordingly, there is a need for more robust designs that can provide desired hydrodynamic functionalities while being manufactured in a rapid manner.

SUMMARY OF THE INVENTION

The present invention relates to microfluidic check valves capable of being manufactured using, e.g., rapid prototyping. In particular instances, the valves include a pre-stressed spring and an elastomeric pad, in which the spring presses against the pad and provides a pressurized seal. Once applied pressure (e.g., by one or more fluids) is greater than the cracking pressure of the valve, the spring extends and the pad is displaced away from the inlet, thereby allowing fluid to flow from the inlet to an outlet (e.g., a channel, a port, a chamber, etc.).

Various characteristics of the valve can be controlled by providing a pre-stressed spring formed from a first material (e.g., having a first hardness, such as elastic modulus) and an elastomeric pad formed from a second material (e.g., having a second hardness, such as elastic modulus). In some non-limiting instances, the first material is harder or stiffer than the second material. Additional details follow.

Definitions

As used herein, the term "about" means +/−10% of any recited value. As used herein, this term modifies any recited value, range of values, or endpoints of one or more ranges.

By "fluidic communication," as used herein, refers to any duct, channel, tube, pipe, chamber, or pathway through which a substance, such as a liquid, gas, or solid may pass substantially unrestricted when the pathway is open. When the pathway is closed, the substance is substantially restricted from passing through. Typically, limited diffusion of a substance through the material of a plate, base, and/or a substrate, which may or may not occur depending on the compositions of the substance and materials, does not constitute fluidic communication.

By "microfluidic" or "micro" is meant having at least one dimension that is less than 1 mm. For instance, a microfluidic structure (e.g., any structure described herein) can have a length, width, height, cross-sectional dimension, circumference, radius (e.g., external or internal radius), or diameter that is less than 1 mm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

BRIEF DESCRIPTION OF THE DRAWINGS

(FIG. 14B). The channels (from bottom to top) include a no quenching probe positive control (NQ PC), a pre-dried 100 PFU equivalent of RNA positive control (100 PFU PC), a test channel, in this case with 100 PFU per 10 µL of RNA, and a no enzyme control (NEC). Provided is a graph (FIG. 14C) quantifying fluorescence of each reaction channel normalized to the signal in the NQ PC channel. Data represent mean and standard deviation for 3 independent devices (n=3 for NQ PC, 100 PFU PC, and NEC; n=2 for 100 PFU test; n=1 for no template (NT) test).

FIG. 15A shows the base layer, the adhesive layer, and the top layer, in which features are arranged from left to right in the order or assembly. FIG. 15B shows the valve housing.

DETAILED DESCRIPTION OF THE INVENTION

The present invention relates to component designs for check valves. Generally, the valve includes a pre-stressed planar spring and an elastomeric pad in proximity to an inlet. In use, the spring applies pressure to the pad to close an inlet. In some instances, the inlet further includes an annular ridge (e.g., a raised plastic boss). In other instances, the spring and the elastomeric pad may be one piece or formed together from one or more materials (e.g., from the same material or from different materials).

Fluid flow can be controlled by these check valves. In some instances, the check valve allows for unidirectional flow, in which the pressurized seal resists backflow. In addition, the cracking pressure (or opening pressure) of the valve can be tuned by modifying the spring's planar geometry (e.g., number of beams, width of beams, geometry of beams, etc.) and thickness (e.g., thickness of the planar substrate). Furthermore, the valve can be passive, meaning that external energy is not required to function; and/or the valve can be configured to be normally closed, meaning that the valve prevents fluid flow in its initial state. In some instances, the cracking pressure can be altered by changing the material (e.g., plastics, rubbers, elastomers, metals, carbon composites (e.g., carbon fiber), etc.).

The valve can be manufactured in any useful manner, e.g., by laser-cutting, die-cutting, conventional machining, and/or molding. In one non-limiting embodiment, the valve is a passive, normally closed check valve that is wholly manufactured from commonly available materials with a laser (e.g., a $CO_2$ laser).

Such valves can be produced as stand-alone, modular components (e.g., that are readily integrated into prototype devices or cartridges having valve seats to accommodate the valves) or as integrated, monolithic structures within a fluidic cartridge (e.g., as layer-by-layer constructs including such valve assemblies). Any useful network of valves may be employed to produce the desired fluidic network. For instance, two valves may be placed in series to create a simple pump, which may be operated by hand.

Figure 1A:
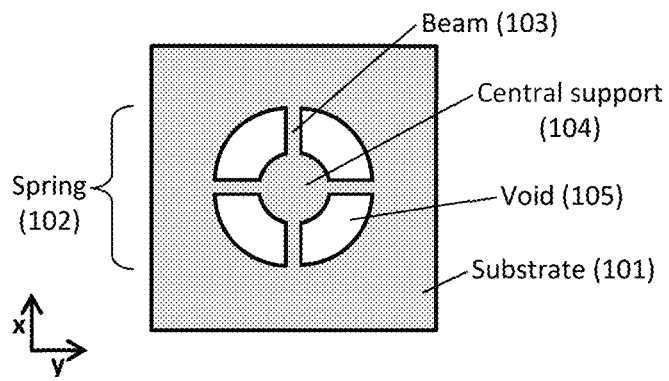
FIG. 1A-1I shows schematics of exemplary check valves in various views. Provided are (A) a top view of an exemplary spring 102; (B) an exploded view of an exemplary check valve; (C) a cross-sectional view along line 1C-1C in FIG. 1B; (D) a cross-sectional view along line 1D-1D in FIG. 1B; (E) a cross-sectional view of another exemplary check valve 1000 including a two-part lid structure; and (F) a cross-sectional view of yet another exemplary check valve 1100 including a modified base structure. Also provided are views of (G) an assembled check valve 100; (H) a normally closed (NC) valve assembly 100A; and (I) an opened NC valve assembly 100B.
Figure 1B:
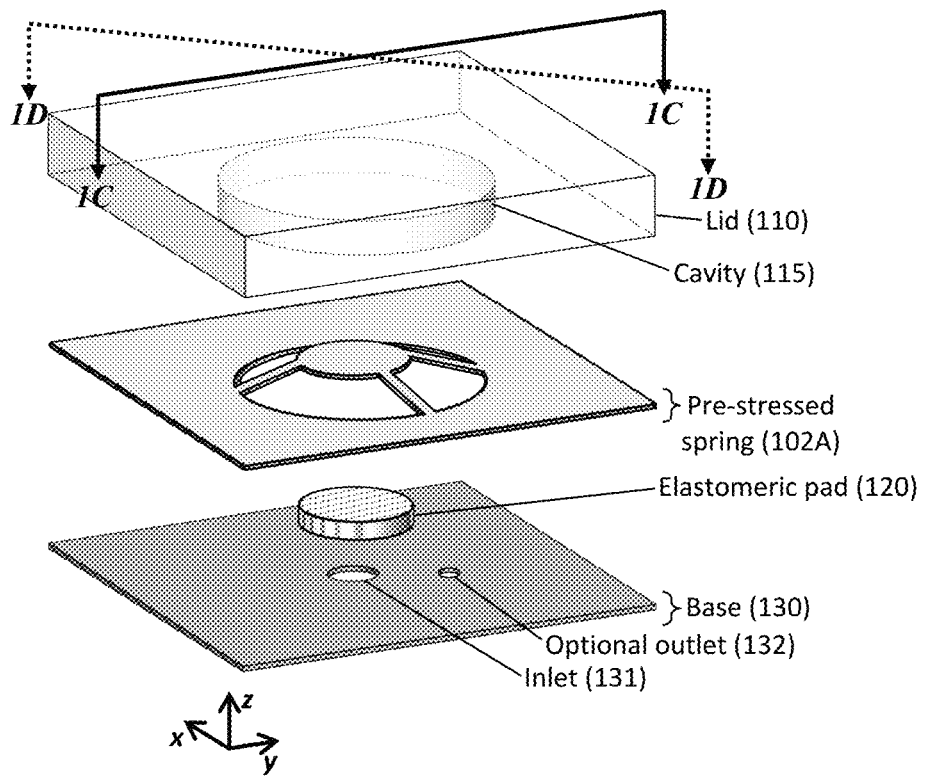

FIG. 1A-1B provides an exemplary check valve, which includes a pre-stressed spring 102A and an elastomeric pad 120. As seen in FIG. 1A, the spring 102 includes a substrate 101 and one or more beams 103 extending from a central support 104, in which each beam is defined by one or more voids 105 within the substrate 101. Additional structural components for the spring, as well as other spring designs are provided in FIG. 9A-9B.

After fabrication from a planar substrate, the spring is not pre-stressed. However, upon positioning the spring against an elastomeric pad, the pad pushes against the central support of the spring and the non-patterned portion of the substrate is displaced away from the central support. In this way, the beams are extended because the major flat plane of the central support is displaced away from the major flat plane of the non-patterned substrate. Thus, the spring is pre-stressed.

Figure 1C:
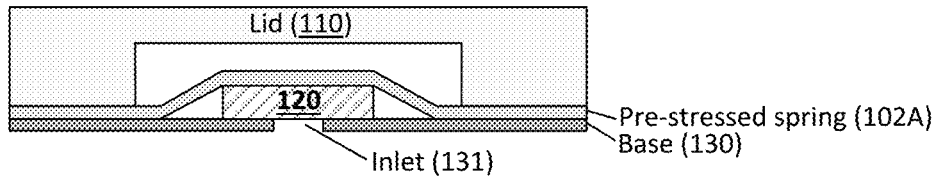
Figure 1D:
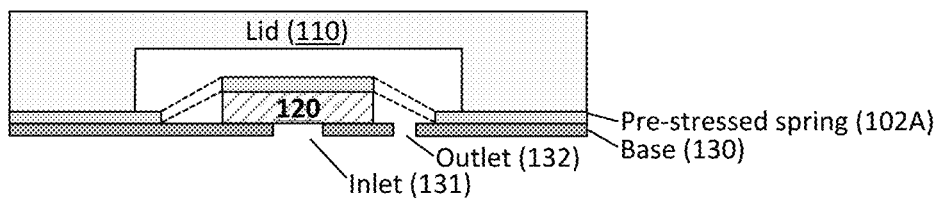

FIG. 1B-1D provides different views of the same device having an integrated check valve. FIG. 1B provides an exploded view including a base 130 having an inlet 131 and an optional outlet 132, an elastomeric pad 120 configured to releasably contact the inlet 131, a pre-stressed spring 102A having a central support configured to contact a surface portion of the elastomeric pad 120, and a lid 110 having a cavity 115 configured to accommodate the pre-stressed spring 102A.

Cross-sectional views are provided in FIG. 1C-1D. As seen in FIG. 1C, the spring 102A is pre-stressed because a portion of the spring is displaced by the elastomeric pad 120 and another portion of the spring is retracted by being held in place between a peripheral portion of the lid 110 and a peripheral portion of the base 130. In a normally closed valve, the elastomeric pad 120 blocks the inlet 131. As seen in FIG. 1D, the elastomeric pad 120 does not block the outlet 132, such that displacement of the elastomeric pad 120 results in unblocking of the inlet 131 and allowing a fluid to flow from the inlet 131 to the outlet 132.

Figure 1E:
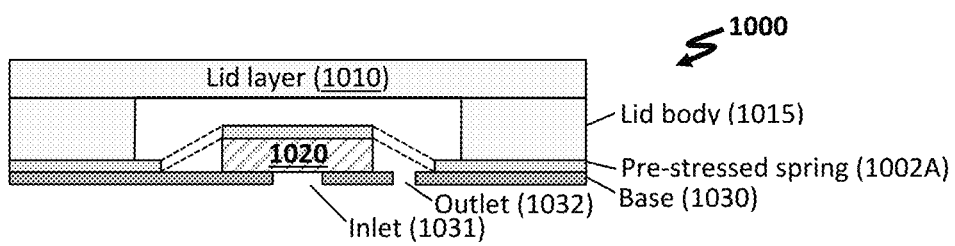

The valve assembly can include any useful modification, including a two-part lid layer or a recessed base. As seen in FIG. 1E, an exemplary valve 1000 includes a base 1030 having an inlet 1031 and an outlet 1032, an elastomeric pad 1020 configured to releasably contact the inlet 1031, a pre-stressed spring 1002A having a central support configured to contact a surface portion of the elastomeric pad 1020, and a lid formed from a top lid layer 1010 and an underlying lid body 1015, which together forms a cavity configured to accommodate the pre-stressed spring 1002A. Furthermore, the relative height of the features on the base of the housing can change. For example, the base at the fluid inlet may be either higher or lower than the outer perimeter of the base, so long as the spring is still pre-stressed.

Figure 1F:
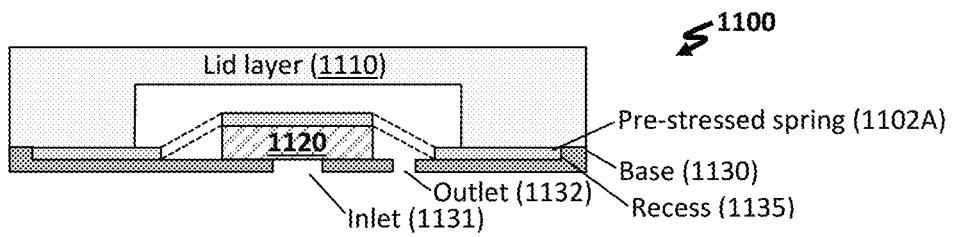

As seen in FIG. 1F, another exemplary valve 1100 includes a base 1130 having an inlet 1131 and an outlet 1132, an elastomeric pad 1120 configured to releasably contact the inlet 1131, a pre-stressed spring 1120A having a central support configured to contact a surface portion of the elastomeric pad 1120, and a lid layer 1110 having a cavity configured to accommodate the pre-stressed spring 1102A. The base 1130 is configured to include a recess 1135 designed to accommodate the peripheral edges of the pre-stressed spring 1102A, in which the recess can simplify alignment of the spring within the valve.

In an alternate configuration, the spring, the elastomeric pad, or the integrated spring/pad is made from a rigid material or plastic; and the base is elastomeric. In this non-limiting, the base deforms to create a tight seal. In some instances, a thin elastomeric coating may be applied to the surface of a rigid base to encourage sealing.

Figure 1G:
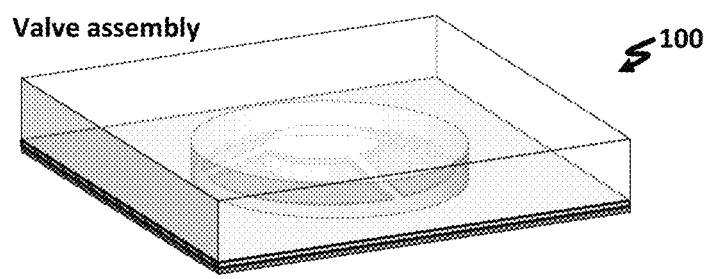
Figure 1H:
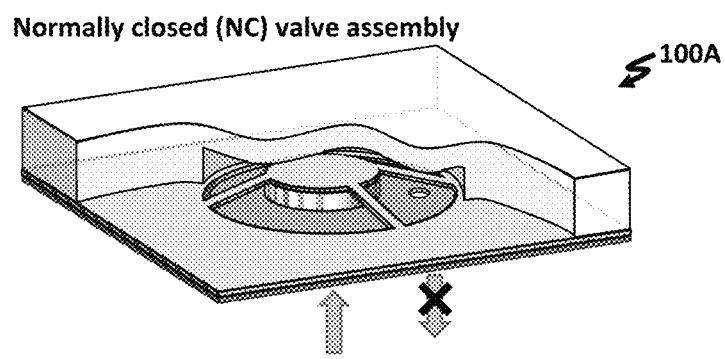
Figure 1I:
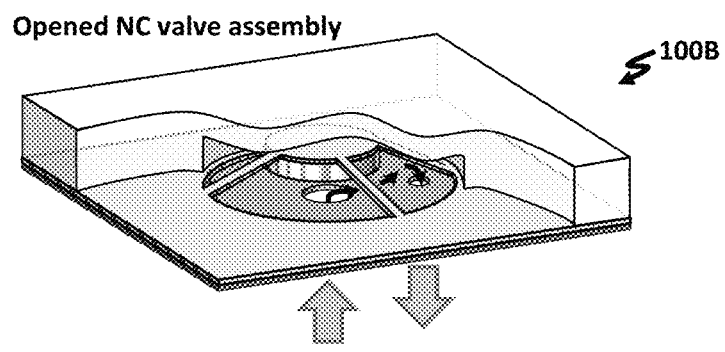

In use, the valve can be assembled (FIG. 1G) to include a normally closed valve (FIG. 1I). In a normally closed state 100A, the pressure at the inlet is insufficient to overcome the critical cracking pressure (or opening pressure). Thus, the valve remains closed, and no fluid is observed at the outlet (arrow with X in FIG. 1I). As pressure with a fluid (e.g., air or water) increases at the inlet of the valve, the elastomeric pad is displaced, which in turn further displaces the pre-stressed planar spring away from the inlet. When the pressure reaches the critical cracking pressure, a gap opens up between the inlet (e.g., including the annular boss, if any) and the elastomeric disc (FIG. 1I). In the opened state 100B, fluid flows from the inlet, into the valve housing, and then into any outlet. Fluid continues to flow away from the inlet, until the pressure falls below the cracking pressure and flow ceases.

The critical cracking pressure can be controlled in any useful manner, e.g., the thickness of the planar spring, the stiffness of the material for the planar spring, the two-dimensional patterning of the planar spring, the length of the beam for the spring, the dimensions of the elastomeric pad, and/or the stiffness of the elastomer. The planar spring can be fashioned from any useful material, e.g., a thin sheet of plastic (e.g., PMMA or Mylar®), metal, or other material with desirable (elastic deformation, flexible) mechanical properties. The elastomeric disc can be made from any useful elastomeric material, e.g., silicone, rubbers, elastomers, thermoplastic elastomers, etc. Softer elastomers can provide a more effective seal, as compared to stiffer elastomers. The valves can be any useful dimension (e.g., a width of about a few mm across to at least 1 cm across) and any useful cracking pressures (e.g., from negligible to about 40 PSIG, as well as greater than about 40 PSIG).

Figure 2A:
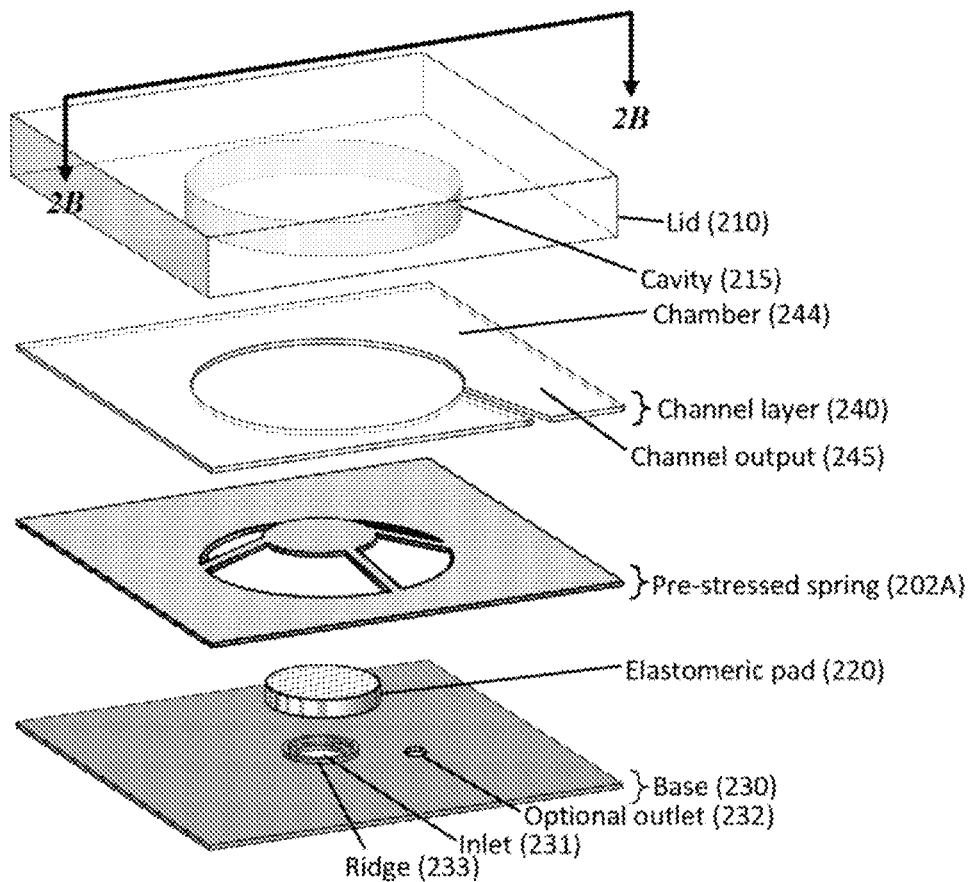
FIG. 2A-2F shows schematics of yet other exemplary check valves in various views. Provided are (A) an exploded view of an exemplary check valve having a channel layer 240; (B) a cross-sectional view along line 2B-2B in FIG. 1A; (C) a cross-sectional view of another exemplary check valve 2000 including a modified base structure; and (D) a cross-sectional view of yet another exemplary check valve 2100 including a modified lid structure. Also provided are views of (E) a normally closed (NC) valve assembly 200A; and (F) an opened NC valve assembly 200B.
Figure 2B:
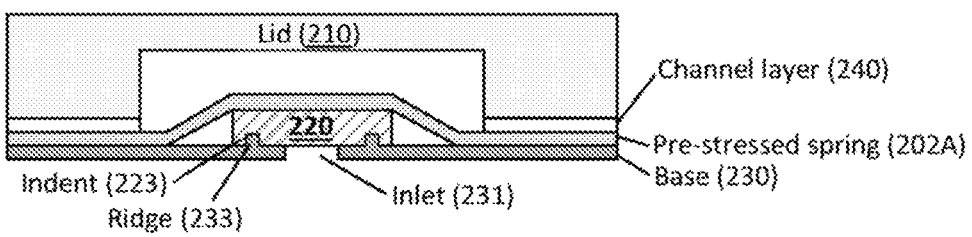

The valve can include any other structural component to promote a leak-free seal. In one instance, the valve includes a ridge surrounding the inlet. The ridge can have any useful profile, such as a square, chamfered, rounded, or knife edge. FIG. 2A-2B provided an exemplary valve, which includes a base 230 having an inlet 231 surrounded by a ridge 233 and an optional outlet 232, an elastomeric pad 220 configured to releasably contact the ridge 233, a pre-stressed spring 202A having a central support configured to contact a surface portion of the elastomeric pad 220, a channel layer 240 including a chamber 244 configured to accommodate the pre-stressed spring 202A and a channel output 245, and a lid 210 having a cavity 215 configured to accommodate the pre-stressed spring 202A.

As seen in FIG. 2B, the spring 202A is pre-stressed because a portion of the spring is displaced by the elastomeric pad 220 and another portion of the spring is retracted by being held in place between a peripheral portion of the lid 210 and a peripheral portion of the base 230. The elastomeric pad 220 can be configured to interact with the ridge 233 in any useful manner. In one instance, the pad includes an indent 223 formed by deformation of the elastomeric material of the pad. In another instance, the pad includes a recess that mates with the ridge 233.

Figure 2C:
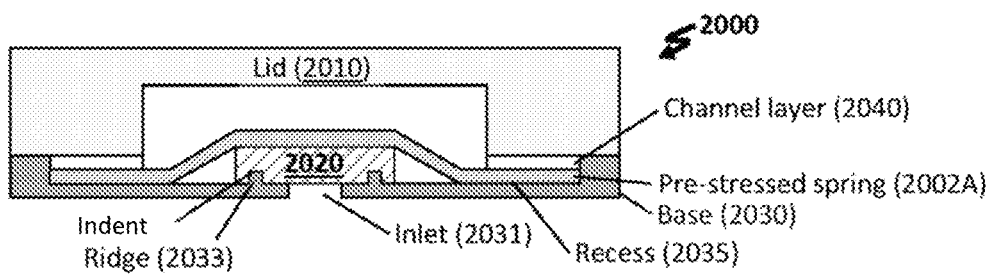

In another embodiment, as seen in FIG. 2C, another exemplary valve 2000 includes a base 2030 having an inlet 2031 surrounded by a ridge 2033, an elastomeric pad 2020 having an indent 2023 configured to releasably contact the ridge 2033 and block the inlet 2031, a pre-stressed spring 2002A having a central support configured to contact a surface portion of the elastomeric pad 2020, a channel layer 2040, and a lid layer 2010 having a cavity configured to accommodate the pre-stressed spring 2002A. The base is configured to include a recess 2035 designed to accommodate the peripheral edges of the pre-stressed spring 1102A and the channel layer 2040, in which the recess can simplify alignment of the spring and the channel layer within the valve.

Figure 2D:
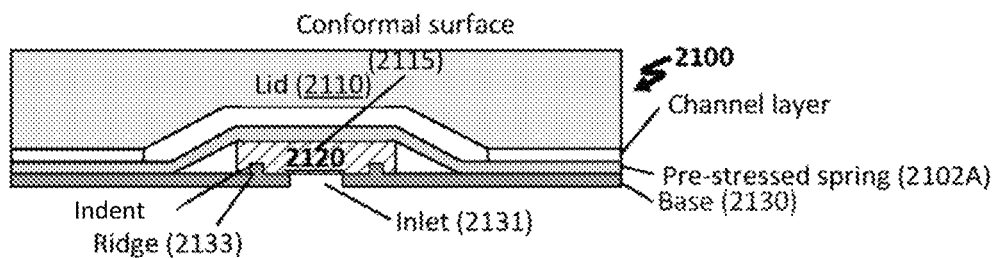

The lid can be configured to minimize dead volume. As seen in FIG. 2D, another exemplary valve 2100 includes a base 2130 having an inlet 2131 surrounded by a ridge 2133, an elastomeric pad 2120 configured to releasably contact the ridge 2133 and block the inlet 2131, a pre-stressed spring 2102A having a central support configured to contact a surface portion of the elastomeric pad 2120, and a lid layer 2110 having a conformal surface 2115 for the cavity configured to accommodate the pre-stressed spring 2102A.

Figure 2E:
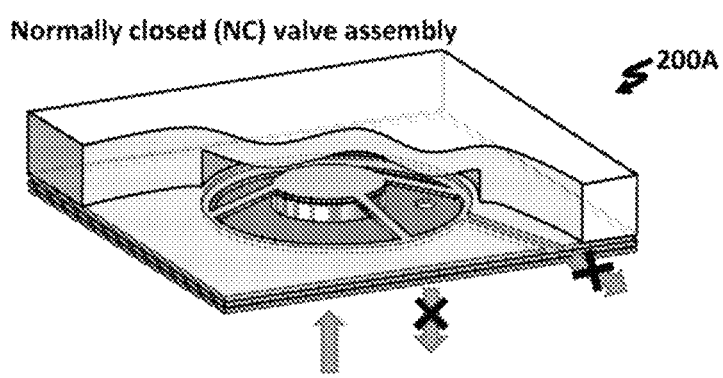
Figure 2F:
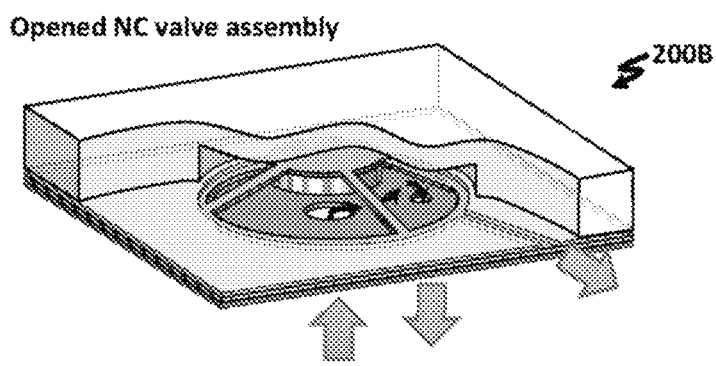

In use, the valve can be assembled to include a normally closed valve (FIG. 2E). In a normally closed state 200A, the pressure at the inlet is insufficient to overcome the critical cracking pressure (or opening pressure). Thus, the valve remains closed, and no fluid is observed at the outlet in the base or in the channel layer (arrows with X in FIG. 2E). As pressure is applied to the inlet of the valve, a gap opens up between the inlet (e.g., including the annular boss, if any) and the elastomeric disc (FIG. 2F). In the opened state 200B, fluid flows from the inlet, into the valve housing, and then into any outlet in the base and/or the channel layer.

Figure 3A:
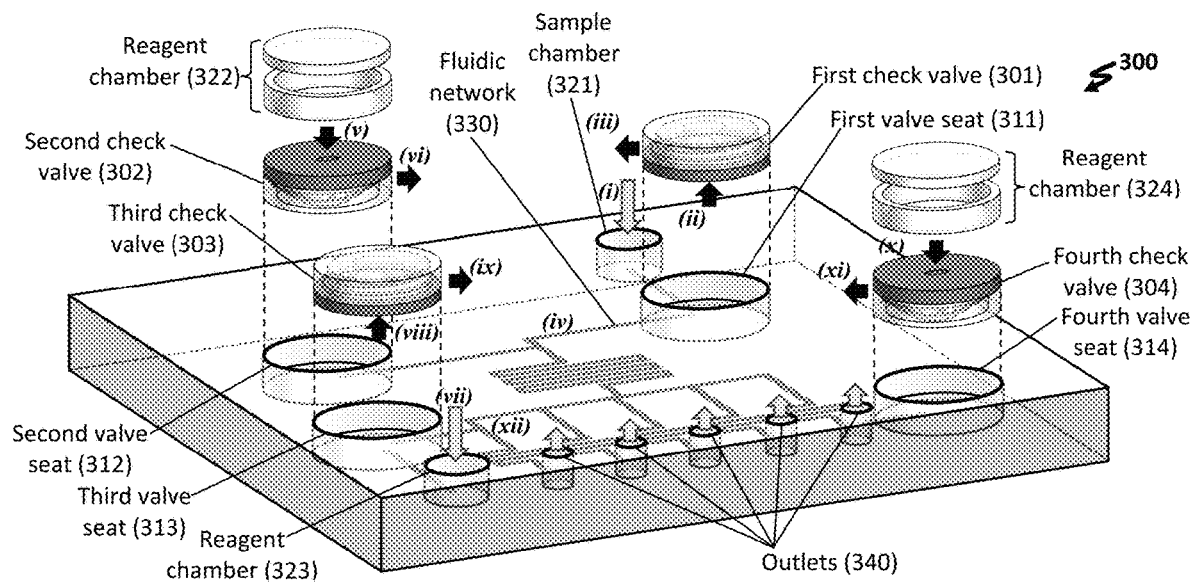
FIG. 3A-3F shows schematics of various fluidic networks including one or more check valves. Provided are (A) an exemplary cartridge 300 including a fluidic network 330 and a plurality of check valves 301,302,303,304; (B) a cross-sectional view of another exemplary fluidic network 3000 including a diaphragm pump 3030 and two check valves 3021,3022; (C) a network diagram of the fluidic network in FIG. 3B; and (D) a schematic showing step-by-step delivery of a sample through a fluidic network. Also provided are (C) a network diagram of another fluidic network 3100 having a single diaphragm pump 3130 configured to be in fluidic communication with a single main channel 3110, as well as (D) a network diagram of yet another fluidic network 3200 having a single diaphragm pump 3230 configured to be in fluidic communication with a plurality of main channels 3210,3212.

Fluidic networks can be designed to accommodate one or more check valves. FIG. 3A provides an exemplary cartridge 300 including a fluidic network 330 having a plurality of outlets 340 and a plurality of check valves 301,302,303,304. Each check valve can be inserted into the cartridge by a designated valve seat 311,312,313,314. Furthermore, each check valve can be associated with a chamber 321,322,323, 324, such that actuation of the valve (e.g., by increasing pressure at the inlet of the valve) results in delivering the contents of the chamber into the valve.

Sample and reagent delivery can be staged in any useful manner. In one instance, the cartridge is designed to deliver a single sample to various channels within the device, as well as to deliver reagents by actuating a check valve. In use, as seen in FIG. 3A, staged delivery can include delivery of the sample (arrow (i)) from the sample chamber 321 to an inlet (arrow (ii)) of the first check valve 301. When pressure of the sample overcomes the critical cracking pressure of this check valve 301, the sample will be delivered (arrow (iii)) to the fluidic network 330 (iv). This network 330 is in fluidic communication with a second check valve seat 312, which accommodates the second check valve 302. By applying pressure (e.g., with a finger) to the first reagent chamber 322 disposed above the second check valve 302, the first reagent is delivered (arrow (v)) to the inlet of the check valve 302. If the applied pressure is in excess of the critical cracking pressure of this check valve 302, then the first reagent will be delivered (arrow (vi)) to the fluidic network 330.

Additional reagents can be delivered to the fluidic network in any useful manner. For instance, the device can include an on-chip reagent chamber 323, which can be manually loaded (arrow (vii)) (e.g., by a pipettor) and is in fluidic communication (arrow (viii)) with the inlet of the third check valve 303. Delivery of this reagent occurs when pressure of the reagent overcomes the critical cracking pressure of the third check valve 303 (arrow (ix)). Reagent chambers can be included at any location of the cartridge. For instance, the device can include a fourth check valve seat 314, which accommodates a fourth check valve 304. By applying pressure (e.g., with a finger) to the reagent chamber 324 disposed above the fourth check valve 304, the reagent is delivered (arrow (x)) to the inlet of the check valve 304. If the applied pressure is in excess of the critical cracking pressure of this check valve 304, then the reagent will be delivered (arrow (xi)) to the fluidic network 330. Fluid will flow towards the outlet 340 (arrow (xii)) until pressure equalizes. Optionally, the outlet can dead-end into a chamber (e.g., an air pocket) to provide a closed system.

Figure 3B:
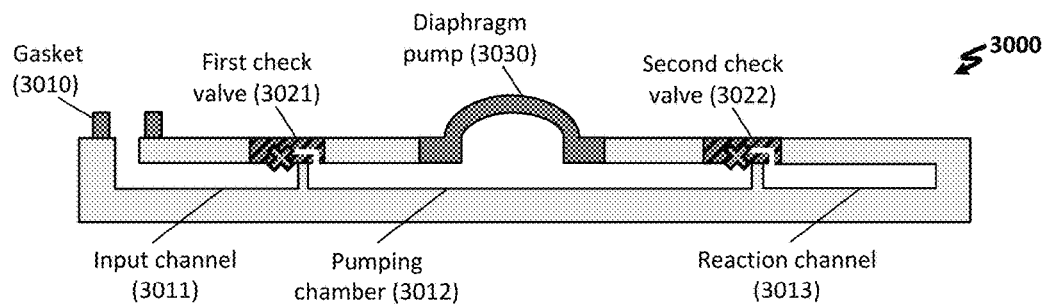
Figure 3C:
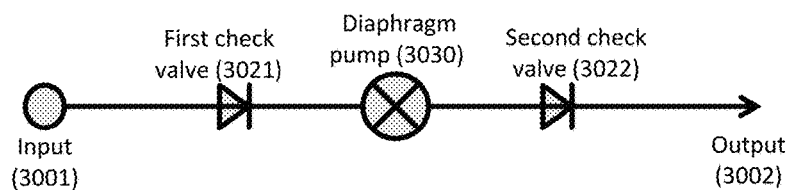

Any useful fluidic networks can be implemented, e.g., by arranging valves in any useful manner. FIG. 3B provides a fluidic module 3000 (e.g., a device or a portion of a device) in which a first check valve 3021 is disposed upstream of a diaphragm pump 3030 (e.g., a finger-operated pump), and a second check valve 3022 is disposed downstream of a diaphragm pump 3030. In this way, fluid flow can be controlled, such that actuation of the diaphragm pump will result in unidirectional fluid flow and not result in backflow. Also included is a gasket 3010 to facilitate delivery of a sample to the input channel 3011, a pumping chamber 3012 including the pump 3030, and a reaction channel 3013 downstream of the second check valve 3022. FIG. 3C provides a network schematic of the device in FIG. 3B, in which the network includes an input 3001 (corresponding to the input channel 3011), a first check valve 3021, a diaphragm pump 3030, a second check valve 3022, and an output 3002 (corresponding to the reaction channel 3013 or an outlet downstream of the reaction channel).

Figure 3D:
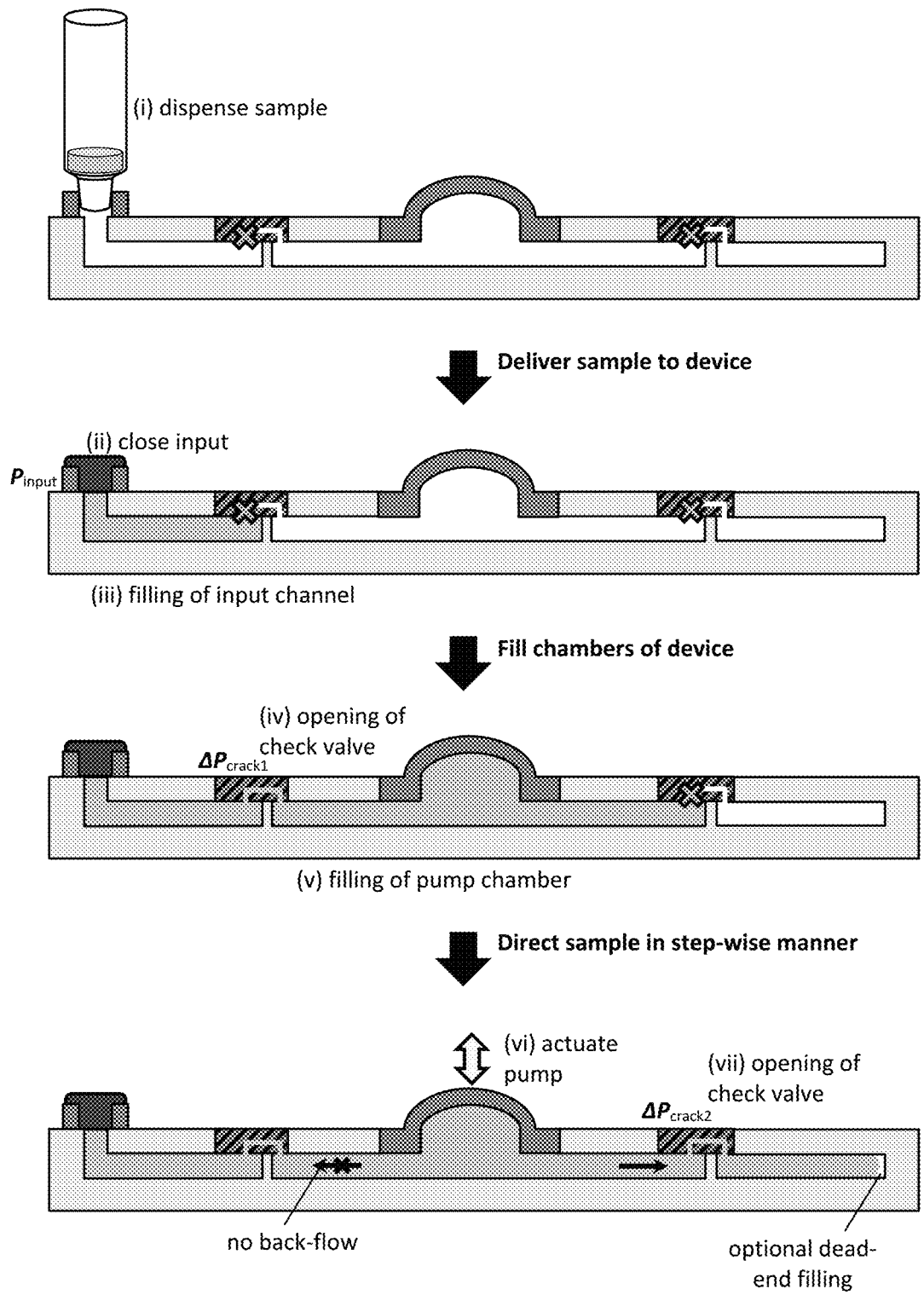

In use, a sample can be delivered to the module 3000 in any useful manner. As seen in FIG. 3D, a sample can be dispensed (i) by way of a syringe containing the sample, in which a tip of the syringe is inserted into the gasket in fluidic communication with the input channel. When the gasket is closed (ii), the input channel is filled (iii). If the applied pressure $P_{input}$ of the fluid in the input channel overcomes the critical cracking pressure $\Delta P_{crack1}$ of the first check valve (iv), then the valve opens and the next chamber (i.e., the pumping chamber) is filled (v). Next, the pump can be actuated (vi), which provides unidirectional flow of the sample through pumping chamber with no backflow through the first check valve. If actuation provides an increase in pressure that overcomes the critical cracking pressure $\Delta P_{crack2}$ of the second check valve, then the second check valve will open (vii), thereby filling the reaction channel. As can be seen, the reaction channel can include a dead-end, thereby facilitating dead-end filling.

Figure 3E:
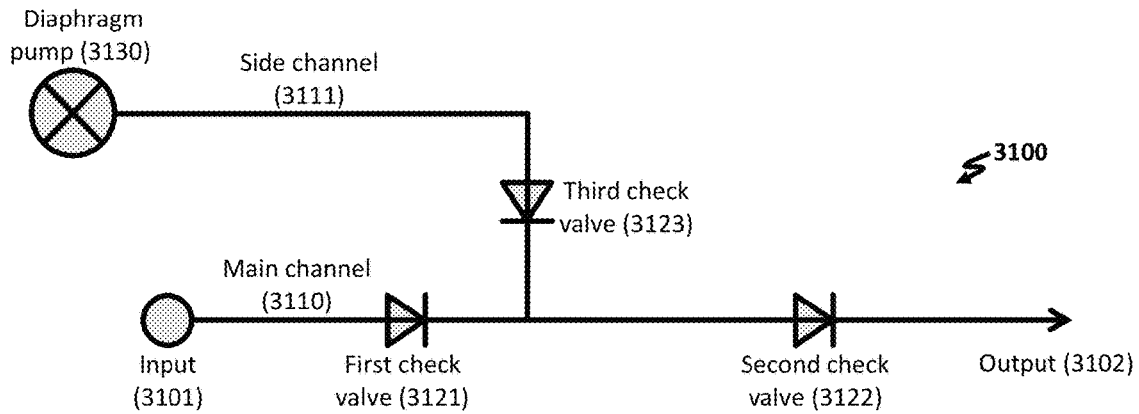

Any fluidic network can be implemented with a diaphragm pump to control delivery of reagents and/or samples throughout the device. FIG. 3E provides an exemplary network schematic 3100 of a device, in which the network includes an input 3101 in fluidic communication with a main channel 3110, a first check valve 3121, a second check valve 3122, and an output 3102. Also included is a diaphragm pump 3130 connected to the main channel 3100 by way of a side channel 3111 including a third check valve 3123. In this network, actuation of the diaphragm pump 3130 results in applying pressure to the inlet of the second check valve 3122 (e.g., to overcome the critical cracking pressure of the second check valve 3122) without risk of backflow to contaminate the diaphragm pump 3130 or the input 3101.

Figure 3F:
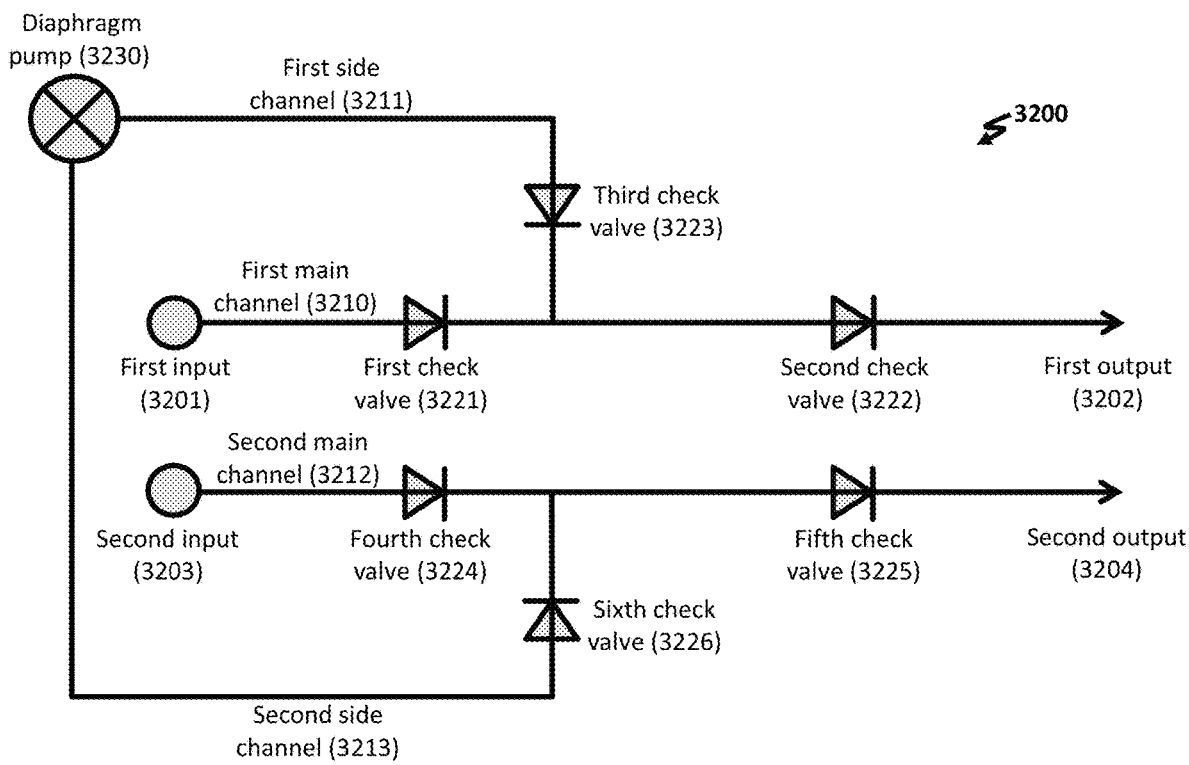

FIG. 3F provides another exemplary network schematic 3200 of a device, in which a single diaphragm pump 3230 can be used to apply pressure to two main channels 3210, 3212 in a simultaneous manner. The network 3200 includes a first input 3201 in fluidic communication with a first main channel 3210, a first check valve 3221, a second check valve 3222, and a first output 3202. The network 3200 also includes a parallel network including a second input 3202 in fluidic communication with a second main channel 3212, a fourth check valve 3224, a fifth check valve 3225, and a second output 3204. The two main channels 3210,3212 are in fluidic communication with the diaphragm 3230 (in a unidirectional manner) by way of side channels 3211,3213 with check valves 3223,3226, respectively. In this configuration, actuation of the diaphragm pump 3230 results in applying pressure to the inlet of the second check valve 3222 and the fifth check valve 3225 (e.g., to overcome the critical cracking pressure of these check valves) without risk of backflow to contaminate the diaphragm pump 3230 or the inputs 3201,3203.

Figure 4A:
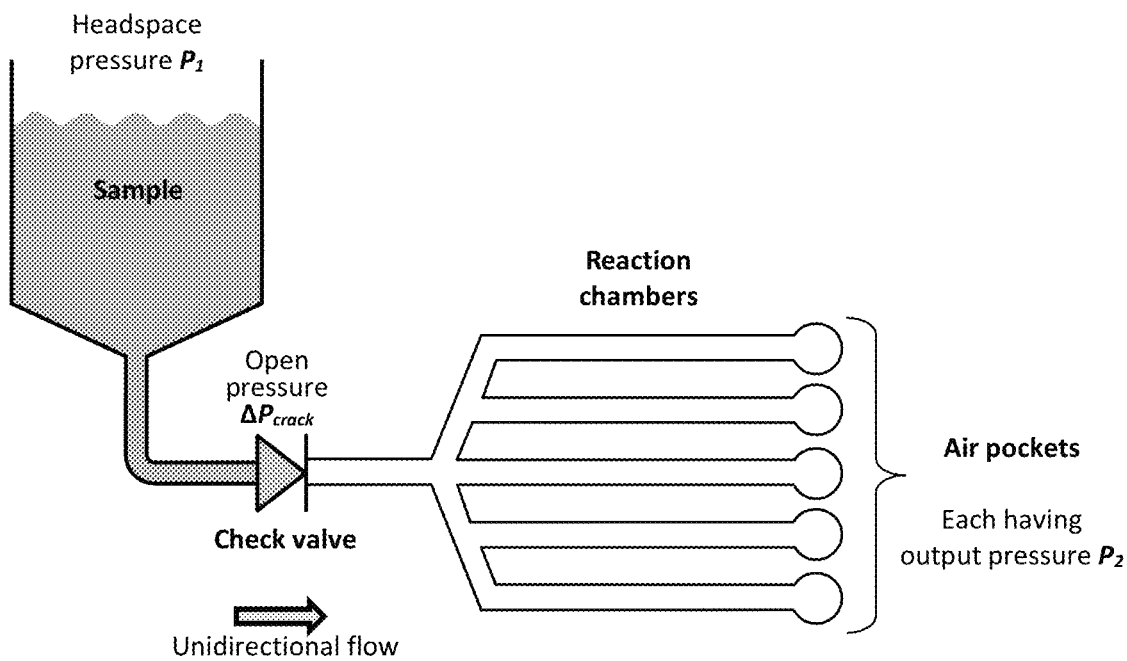
FIG. 4A-4B shows schematics of an exemplary method for valve-enabled channel filling. Provided are (A) a schematic showing how headspace pressure $P_1$ and opening pressure $\Delta P_2$ of the check valve affects fluid movement; and (B) a schematic showing how output pressure $P_2$ affects fluid filling of the reaction channels.
Figure 4B:
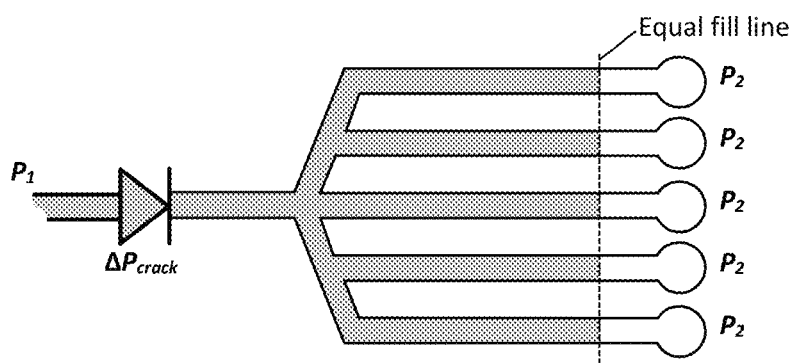

Valves can be employed to enable channel filling (FIG. 4A-4B). When $P_1 = \Delta P_{crack}$, then fluid moves into reaction channels. Due to volumetric compression of air, $P_2$ increases. Generally, when $P_1$ approaches $\Delta P_{crack}$ is greater than $P_2$, the fluidic channels of the cartridge will continue to fill (FIG. 4A). At steady state, $P_1 = P_2$ (FIG. 4B). Then, $P_1$ can be released back to a pressure $P_1$ such that $P_1 - P_2 < \Delta P_{crack}$ (e.g., atmospheric pressure), and the check valve will seal in the contents within the reaction channel.

Chambers

The present apparatus (e.g., cartridge) can include one or more chambers, which can be configured to substantially enclose a fluid or a substance in the fluidic cartridge. Such chamber can include one or more inlets, outlets, fluidic opening (e.g., vias), fluidic barriers, or any other structure to allow for fluidic communication between one or more chambers, sample ports, vents, etc. Exemplary chambers include a channel, a reservoir, etc., having any useful geometry or dimension. In some instances, the valve housing itself can serve as a chamber.

The chambers can be designated for a particular use. Particular uses for such chambers include a sample chamber for receiving and/or storing a test sample, an incubation chamber for incubating a test sample (e.g., to amplify one or more targets), a reagent chamber containing one or more reagents for detecting one or more targets (e.g., on-chip, dried reagents), a sterilization chamber containing one or more reagents to sterilize or disinfect the test sample (e.g., containing one or more sterilization agents, as described herein), an assay chamber for conducting one or more assays to detect one or more targets, and/or a waste chamber for storing one or more by-products of the assay. Each of these chambers can be interconnected by a valve (e.g., a check valve, such as any described herein) and/or a channel that can optionally include such a valve in its fluidic path.

Each chamber can be functionalized in any manner, such as by coating (e.g., with a polymer, a gel, etc.), treating (e.g., with a silane, an amide, plasma, UV, ozone, etc. to change the surface chemistry of a surface, such as by modifying hydrophilicity and/or biocompatibility), passivating (e.g., with wax), purging (e.g., with an inert gas and/or under vacuum), and/or sterilizing with a sterilization agent (e.g., bleach, UV, ozone, etc.).

Materials

The present check valves and cartridges can be formed from any useful material. Exemplary materials include a polymer, such as polymethyl methacrylate (PMMA), polyester, polyethylene terephthalate (PET, e.g., biaxially-oriented PET or bo-PET, such as Mylar®), an acrylic polymer, poly(dimethylsiloxane) (PDMS), polycarbonate (PC), cyclo-olefin copolymer (COC), cyclo-olefin polymer (COP), polyethylene terephthalate glycol (PETG), polyethylene (PE, such as branched homo-polymer PE), polyvinylchloride (PVC), polystyrene (PS), styrene copolymer, polyimide (PI), polypropylene (PP), polytetrafluoroethylene (PTFE), polynorbornene (PN), poly(4-methyl-1-pentene), silicone, and combinations or co-polymers thereof; a thermoplastic material; an elastomeric material; silicon; glass; an adhesive, such as any described herein; as well as combinations thereof (e.g., combinations of such materials provided in separate layers or within the same layer). Polymers can include any useful additive, such as, e.g., fillers (e.g., mica, talc, or calcium carbonate), plasticizers (e.g., dioctyl phthalate), heat stabilizers (e.g., organo-tin compounds), antioxidants (e.g., phenols or amines), and/or UV stabilizers (e.g., benzophenones or salicylates). Such materials can be provided in any useful form, such as in one or more layers that can be laminated to provide the assembled cartridge.

Exemplary thermoplastic materials (e.g., for a pre-stressed spring) include PMMA, PET, PC, polycyclic olefin (PCO), acrylonitrile butadiene styrene (ABS), polylactic acid (PL), PE, PTFE, etc. In particular non-limiting embodiments, a thermoplastic material is one capable of being cut, patterned, molded, or bent by applying a heat source (e.g., a laser). Exemplary elastomeric materials (e.g., for an elastomeric pad) include silicone, rubber, fluorosilicone, nitrile rubber, PDMS, etc.

The apparatus (e.g., check valve and/or cartridge) can include one or more layers containing one or more adhesive materials. Exemplary adhesive materials include an acrylate (e.g., a silicone acrylate, a polymethyl acrylate, a polymethyl methacrylate, including those formed from 2-ethyl hexyl acrylate or n-butyl acrylate monomers, etc.), a polyolefin (e.g., polyethylene, polybutene, or polypropylene), an acetate (e.g., an ethylene-vinyl acetate), a styrene (e.g., a polystyrene, a styrene block copolymer (e.g., styrene-butadiene-styrene, styrene-isoprene-styrene, styrene-ethylene/butylene-styrene, or styrene-ethylene/propylene), an isobutylene (e.g., polyisobutylene, a copolymer of isobutylene with isoprene, including copolymers thereof), a rubber (e.g., a polyisoprene, a silicone rubber, a polychloroprene, a polyisobutylene, as well as copolymers of any of these), a polyamide, a polyester, a polyurethane, a polynitrile (e.g., nitrile butadiene rubber), a polyether (e.g., a vinyl ether), etc. The adhesive material can be provided in any useful format. For instance, the adhesive material can be provided as a substantially planar substrate having one or more removed portions to define one or more chambers. Such layers can be provided as a backing layer (e.g., a polyester layer) coated with an adhesive material (e.g., an acrylic). In some embodiments, the adhesive material is sterilized (e.g., by steam, ethylene oxide, ozone, bleach, radiation, etc.).

Additional Components

The present cartridge can include one or more additional components, as described herein. For instance, one or more detection components can be provided, which can allow for detection by electrochemical, colorimetric, fluorescent, western blot, immunohistochemistry, immunoassay (e.g., lateral flow assay), immunochromatography, radio immunoassay, optical immunoassay, enzyme immunoassay, and chemiluminescence, and/or electrochemiluminescence methods in any useful format.

The device can include one or more separation/extraction components (e.g., filters, posts, membranes, weirs (optionally including beads), matrices, or high voltage electrodes for performing on-chip capillary electrophoresis separations); heating components (e.g., electrodes or filaments); pumps (e.g., active or passive pumps, such as a low flow rate peristaltic pump or application of negative pressure, such as by actuating a valve); a membrane (e.g., placed within a channel and/or a chamber); a multifunctional sensor (e.g., to measure temperature, strain, and electrophysiological signals, such as by using amplified sensor electrodes that incorporate silicon metal oxide semiconductor field effect transistors (MOSFETs), a feedback resistor, and a sensor electrode in any useful design, such as a filamentary serpentine design); a microscale light-emitting diode (LEDs, such as for optical characterization of the test sample); an active/passive circuit element (e.g., such as transistors, diodes, and resistors); an actuator; a wireless power coil; a device for radio frequency (RF) communications (e.g., such as high-frequency inductors, capacitors, oscillators, and antennae); a resistance-based temperature sensor; a photodetector; a photovoltaic cell; a diode; a data-processing circuit powered by the power source and electrically connected to the energy source; and/or one or more components for autonomous remote monitoring of a sample, such as an analog-to-digital converter, a radiofrequency module, and/or a telemetry unit (e.g., configured to receive processed data from a data-processing circuit electrically connected to the detection component and to transmit the data wirelessly).

Kits

The present valves and cartridges including such valves can further be provided in a kit. The kit can include one or more of the following: a collection swab for collecting a test sample, a cartridge (e.g., a disposable cartridge) having one or more valves described herein, on-chip reagents stored within a cartridge (e.g., any described herein), an external heater for incubating the test sample within the apparatus (e.g., including a heating component and an optional microcontroller for temperature feedback control), an excitation component (e.g., a light-emitting diode), a detection component (e.g., a light-emitting diode and/or a photodiode), and/or a telemetry unit. In one instance, the detection component and the telemetry unit is integrated into one device (e.g., a smart phone having a sensor, such as a camera, for detection and having an application to analyze captured photographs).

Methods of Use

The present cartridge includes one or more valves that can be integrated with any assay for detecting any target of interest (e.g., any described herein). In particular, the cartridge of the invention is disposable, thereby facilitating single-use detection of samples that could be easily contaminated or could be potentially hazardous (e.g., infectious). In some embodiments, the cartridge is configured for sensing a nucleic acid (e.g., DNA or RNA), as well as for detecting a pathogen (e.g., a bacterial pathogen, such as any herein), metabolite, genetic modification, and/or pesticide for any use (e.g., livestock monitoring, crop maintenance, as well as any other agricultural use). Exemplary uses include any useful methodology for detection a target (e.g., any described herein), such as polymerase chain reaction amplification, cell culture techniques, etc.

Targets and Samples

The present cartridge can be used to detect any useful targets (e.g., a target nucleic acid or a nucleic acid sequence derived from the target or identifiable as the target). Exemplary targets include a bacterium, such as such as *Bacillus* (e.g., *B. anthracis*), Enterobacteriaceae (e.g., *Salmonella, Escherichia coli, Yersinia pestis, Klebsiella*, and *Shigella*), *Yersinia* (e.g., *Y. pestis* or *Y. enterocolitica*), *Staphylococcus* (e.g., *S. aureus*), *Streptococcus, Gonorrheae, Enterococcus* (e.g., *E. faecalis*), *Listeria* (e.g., *L. monocytogenes*), *Brucella* (e.g., *B. abortus, B. melitensis*, or *B. suis*), *Vibrio* (e.g., *V. cholerae*), *Corynebacterium diphtheria, Pseudomonas* (e.g., *P. pseudomallei* or *P. aeruginosa*), *Burkholderia* (e.g., *B. mallei* or *B. pseudomallei*), *Shigella* (e.g., *S. dysenteriae*), *Rickettsia* (e.g., *R. rickettsii, R. prowazekii*, or *R. typhi*), *Francisella tularensis, Chlamydia psittaci, Coxiella burnetii, Mycoplasma* (e.g., M *mycoides*), etc.; an allergen, such as mycotoxins, mold spores, or bacterial spores such as *Clostridium botulinum* and *C. perfringens*; a toxin, such as ricin, mycotoxin, tetrodotoxin, anthrax toxin, botulinum toxin, staphylococcal entertoxin B, or saxitoxin; a virus, such as Adenoviridae (e.g., adenovirus), Arenaviridae (e.g., Machupo virus), Bunyaviridae (e.g., Hantavirus, La Crosse encephalitis virus, or Rift Valley fever virus (RVFV)), Coronaviridae, Orthomyxoviridae (e.g., influenza viruses), Filoviridae (e.g., Ebola virus and Marburg virus), Flaviviridae (e.g., Japanese encephalitis virus (JEV), dengue fever virus (DENV), Zika virus (ZIKV), West Nile virus (WNV), Saint Louis encephalitis virus (SLEV), Rocio virus (ROCV), Usutu virus (USV), Ilheus virus (ILHV), and yellow fever virus (YFV)), Hepadnaviridae (e.g., hepatitis B virus), Herpesviridae (e.g., herpes simplex viruses), Papovaviridae (e.g., papilloma viruses), Paramyxoviridae (e.g., respiratory syncytial virus, measles virus, mumps virus, or parainfluenza virus), Parvoviridae, Picornaviridae (e.g., polioviruses), Poxviridae (e.g., variola viruses), Reoviridae (e.g., rotaviruses), Retroviridae (e.g., human T cell lymphotropic viruses (HTLV) and human immunodeficiency viruses (HIV)), Rhabdoviridae (e.g., rabies virus), and Togaviridae (e.g., alphaviruses, encephalitis viruses, yellow fever virus, Chikungunya virus (CHIKV), Eastern equine encephalitis virus (EEEV), Western equine encephalomyelitis virus (WEEV), Venezuelan equine encephalitis virus (VEEV), Barmah Forest virus (BFV), Highlands J virus (HJV), Ross River virus (RRV), Sindbis virus (SINV), and rubella virus), including arboviruses, such as DENV, EEEV, JEV, RVFV, SLEV, tick-borne encephalitis virus (TBEV), VEEV, WEEV, WNV, YFV, ZIKV, or any other described herein; a protozoon, such as *Cryptosporidium parvum, Encephalitozoa, Plasmodium, Toxoplasma gondii, Acanthamoeba, Entamoeba histolytica, Giardia lamblia, Trichomonas vaginalis,*

*Leishmania*, or *Trypanosoma* (e.g., *T. brucei* and *T. Cruzi*); a helminth, such as cestodes (tapeworms), trematodes (flukes), or nematodes (roundworms, e.g., *Ascaris lumbricoides, Trichuris trichiura, Necator americanus*, or *Ancylostoma duodenale*); a parasite (e.g., any protozoa or helminths described herein); a fungus, such as Aspergilli, Candidae, *Coccidioides immitis*, and Cryptococci; a pathogen; an environmental contaminant; a water additive; an agricultural marker; a nucleic acid (e.g., oligonucleotides, polynucleotides, nucleotides, nucleosides, molecules of DNA, or molecules of RNA, including a chromosome, a plasmid, a viral genome, a primer, or a gene of any useful pathogen, such as those described herein); or a genetic modification (e.g., antibiotic resistance marker gene). Targets also include food-borne pathogens, such as *Salmonella* (e.g., *Salmonella Typhimurium*), pathogenic *E. coli* (e.g., O157:H7), *Bacillus* (e.g., *B. cereus*), *Clostridium botulinum, Listeria monocytogenes, Yersinia* (e.g., *Y. enterocolitica*), Norovirus (e.g., Norwalk virus), *Shigella, Staphylococcus aureus, Toxoplasma gondii, Vibrio* (e.g., *V. vulnificus, V. cholera, V. parahaemolyticus*), *Campylobacter jejuni*, and *Clostridium perfringens*; and weaponized pathogens, such as *Bacillus anthracis, Yersinia pestis, Francisella tularensis, Brucella* (e.g., *B. suis*), *Burkholderia mallei, Burkholderia pseudomallei, Shigella, Clostridium botulinum*, Variola (e.g., *V. major*), Filoviridae (e.g., Ebola virus and Marburg virus), Arenaviridae (e.g., Lassa virus and Machupo virus), *Clostridium perfringens*, any food-borne pathogen (e.g., *Salmonella* species, *Escherichia coli* O157:H7, or *Shigella*), *Chlamydia psittaci, Coxiella burnetii, Staphylococcal aureus, Rickettsia* (e.g., *R. prowazekii* or *R. rickettsii*), Alphavirus (e.g., Venezuelan equine encephalitis virus, eastern equine encephalitis virus, or western equine encephalitis virus), *Vibrio cholerae, Cryptosporidium parvum*, Henipavirus (e.g., Nipah virus), Bunyaviridae (e.g., Hantavirus or Rift Valley fever virus), Flaviviridae (e.g., Japanese encephalitis virus and Yellow fever virus), and *Coccidioides* spp.

The test sample can include any useful sample, such as a microorganism, a virus, a bacterium, a fungus, a parasite, a helminth, a protozoon, a cell, tissue, a fluid, a swab, a biological sample (e.g., blood, serum, plasma, saliva, etc.), a plant, an environmental sample (e.g., air, soil, and/or water), etc.

EXAMPLES

Example 1: Microcheck Valves for Device Integration

Check valves are often important components in microfluidic devices, enabling automated sample processing for diagnostics at the point-of-care. However, there is an unmet need for a check valve design that is compatible with rigid thermoplastic devices during all stages of development—from initial prototyping with a laser cutter to final production with injection molding.

As described herein, we tested simple designs for a passive, normally closed check valve that is wholly manufactured from commonly available materials with a $CO_2$ laser and readily integrated into prototype and production thermoplastic devices. The check valve included a thermoplastic planar spring and a soft elastomeric pad that act together to seal against backflow. The valve's cracking pressure can be tuned by modifying the spring's planar geometry and thickness. In some non-limiting instances, seal integrity was improved with the addition of a raised annular boss beneath the elastomeric pad.

To demonstrate the valve's usefulness, we employed these valves to create a finger-operated on-chip reagent reservoir and a finger-actuated pneumatic pump. We also applied this check valve to passively seal a device to enable portable detection of RNA from West Nile virus in a laser-cut device.

Overall, the present invention encompasses check valves having any useful benefit for on-chip fluid manipulation. Such exemplary benefits can include ease of integration into microfluidic or millifluidic devices, such as by manufacturing pre-stressed spring valves with a modular housing for drop-in use; ease of manufacture, such as by using common materials with simplified two-dimensional patterning of the spring's beams; minimized energy consumption, such as by requiring no external actuation for fluidic manipulation; high-throughput manufacture, such as with injection molding and/or die curing; low backflow failure rate, in which some designs required no minimum back pressure to seal against reverse flow and held more than 60 psi of back pressure without failure; adjustable opening pressure, in which design choice of the spring pattern and the material composition can allow for an adjustable opening pressure from 1-30 psi without changing the form factor; and/or minimized dimensions (e.g., a diameter of less than about 5 mm and/or a thickness of less than about 0.8 mm), which can lead to minimized sample consumption and minimized dead volumes (e.g., less than about 5 µL). Additional details are described herein, e.g., in the following Examples.

Example 2: Valve Fabrication and Testing

The check valves herein can be integrated into any useful fluidic apparatus or housing, as well as fabricated and tested in any useful manner. As described herein, we integrated valves seamlessly with both layer-by-layer assembled prototype chips, as well as precision-machined microfluidic cartridges. The valves also possessed several desirable features, such as one-directional flow, even when the back pressure is very low or very high; low dead volumes (e.g., less than about 5 µL); a thin profile (e.g., less than about 0.6 mm), thereby permitting integration into thin devices; and ease of manufacture, e.g., such as valves that are wholly manufacturable from common materials and amenable to mass production by laser cutting, die cutting, or injection molding. In addition, valve actuation can be passive and repeatable, and valve opening pressure can be tuned by adjusting the planar spring's shape and thickness without modifying the valve housing. Furthermore, valves can be integrated into any useful fluidic circuit in any useful manner, such as, e.g., use as pressure-relief valves in microfluidic circuits.

In one non-limiting embodiment, the check valve including a pre-stressed spring with a separate, soft elastomeric disc at the center of the spring, instead of a photolithographically patterned central rise in the spring itself. This innovation permitted manufacture of robustly sealing check valves with springs patterned from flat sheets of material that was too stiff to effectively conform to valve housings to effect a quality face seal, including thermoplastics and metals. These improved designs allow for integrating these elegant and powerful check valves into point-of-care microfluidic diagnostics, in which robust sealing and passive fluid manipulation are useful. Exemplary materials and methods are as follows.

Valve Fabrication for Laser-Cut Devices and Integration into Machined Devices: Various acrylic layers were employed, including 1.5 mm thick acrylic, and 0.2 mm thick acrylic. Silicone was employed to provide an elastomeric pad, including ultra-soft durometer (10 A) silicone material having a thickness between 0.010 in. to 0.020 in. and soft durometer (40 A) clear silicone material. Polyester films were also employed, including 0.13 mm (0.005 in.) thick and 0.25 mm (0.010 in.) thick PET (Mylar®). In some cases, the protective film from 1.5 mm thick acrylic was transferred to 0.13 mm thick PET. Contact adhesive 468 MP was employed, which has an adhesive having a 0.13 mm thick acrylic adhesive layer and a liner having a 0.11 mm thick coated paper layer. Polyolefin primer and cyanoacrylate adhesive were also employed.

Valve and chip designs were prepared using AutoCAD software. Valves were fabricated using a 50 W $CO_2$ laser cutter (VersaLASER® Systems, Universal Laser Systems®, Scottsdale, Ariz.). Machined valve housings were prepared by conventional machining with an end mill. Valve renderings were prepared using SolidWorks software (SolidWorks Corp., Waltham, Mass.).

Laser-cut devices were assembled layer-by-layer, using small alignment holes where and when necessary. Silicone parts were cleaned with an alcohol solution after cutting to remove powder and residue. Clear silicone gaskets were attached to PMMA chips (e.g., at an inlet and/or an outlet) by first priming the silicone gasket with a polyolefin primer, and then bonding with a thin line of cyanoacrylate adhesive. A static elimination gun was used to remove static charge from laser-cut components.

Measurement of valve opening pressures: Valve opening pressure was measured using a 1 mL plastic syringe filled with air and fitted with a silicone gasket at its tip. This syringe was applied to the supply side of the valve, and the plunger was depressed slowly until air bubbles were observed on the downstream side of the valve, which was immersed in soapy water. The change in volume required to send air through the valve was used to calculate opening pressure according to the following equation: $\Delta P = P1*(V1/V2-1)$, where P1 was assumed to be 1 atm and V1 was 1 mL. This method was validated using a low-pressure regulator connected to a house nitrogen line; values were in agreement to within 5%. Valves were checked for leaking under reverse pressure up to 40 PSI by the same methods.

Onboard reagent storage and finger actuated pump: Colored food dyes were added to PMMA/silicone reservoirs or chambers, which were then adhered atop valve supply holes on the engraved chips. Food dyes were dispensed sequentially by applying finger pressure. Pressing the two eyes of the frog simultaneously with fingers actuated the "microfluidic frog" pump.

RT-LAMP Detection of West Nile Virus: Genomic RNA from WNV (isolate L-CA-04 SAC-04-7168, GenBank accession no. DQ080059) was obtained from partners at UC Davis. Genomic RNA from positive-sense RNA viruses, such as WNV, should be treated as potentially infectious material. WNV targets were amplified employing reverse-transcription loop-mediated isothermal amplification (RT-LAMP). In addition, short, complementary quenchers were employed to hybridize unincorporated primers upon cooling down at the end of the reaction, thereby quenching fluorescence of any unincorporated primer. Primers, dye-labeled primers, and quenching probes were ordered from Integrated DNA Technologies (Coralville, Iowa). The reaction mixture had a final composition (after adding water or template) of 1× Isothermal Amplification Buffer (New England BioLabs, NEB # B05375) supplemented with an additional 6 mM $MgSO_4$ (NEB # B1003S, final 8 mM $MgSO_4$), 1.4 mM of each dNTP (NEB # N0447L), 0.32 units/μL of Bst 2.0 WarmStart DNA polymerase (NEB # M0538M), and 0.2 units/μL of AMV reverse transcriptase (Life Science Advanced Technologies # AMVRTT-5). Primers were used in the amounts typically recommended for LAMP: 0.2 μM each for outer primers F3 and B3; 1.6 μM each for inner primers FIP and BIP; and 0.8 μM each for loop primers LF and LB. Quenching probes were added at 1.5× the concentration of the corresponding fluorescently labeled primer.

RT-LAMP was performed in 10 μL reaction volumes in thin-walled PCR strip tubes or laser-cut microfluidic chips. Reagents were added to chips by pipetting reagent mixtures into conical paraffin wax cups placed atop the valve openings. A modified syringe with a silicone gasket was then used to pressurize the sample headspace, passing the fluid into the reaction chamber. Chips were then cleaned externally with bleach solution and alcohol to remove excess reagents from their surface. Filled chips were heated on a hot plate to 65° C. for 30 minutes and then cooled to room temperature for visualization with a camera.

Example 3: A Simple Check Valve for Microfluidic Point-of-Care Diagnostics

Medical diagnostics continue to migrate away from well-equipped central laboratories toward the point-of-care (POC). Innovations in microfluidic technologies have contributed to this shift by miniaturizing equipment and automating complex sample processing and reagent manipulation. Microfluidic device components, especially valves, direct this manipulation through the controlled movement of fluids. A number of microfluidic valves and valve-like components exist, including single-use capillary burst valves and frangible seals, rotary and multiport valves, and check valves. Check valves are particularly useful features, providing one-directional fluid flow and enabling staged or metered sample delivery into common reservoirs. These functions are essential for emulating the actions required of laboratory technicians and larger automation equipment for performing diagnostic assays.

There is currently an unmet need for a mass-manufacturable passive check valve that integrates into devices during both early stage engineering design and final production by injection molding. Check valves have been widely used in microfluidic devices made from polydimethylsiloxane (PDMS), a highly flexible substrate prepared using photolithographic techniques. The most common type of valve in PDMS is what we colloquially refer to as the Quake-style valve, which uses vacuum or pressure-actuated control lines to occlude or open channels to flow (see, e.g., Li W et al., "Squeeze-chip: a finger-controlled microfluidic flow network device and its application to biochemical assays," *Lab Chip* 2012; 12:1587-90; and Xu K et al., "Simultaneous metering and dispensing of multiple reagents on a passively controlled microdevice solely by finger pressing," *Lab Chip* 2015; 15:867-76). Despite their broad use in academic research, microfluidic PDMS devices have not been commercialized as POC diagnostics due to the relatively high per unit cost of production with photolithography versus injection molding. This financial reality, combined with the fact that the Quake valve is an active valve that requires a dedicated actuation mechanism, excludes Quake-style check valves from commercial products, which are typically made from rigid, injection-molded thermoplastics like PMMA, COC, polycarbonate, and polypropylene.

To address this need, microfluidic ChipShop GmbH (Jena, Germany) has produced rotary multiport valves by two-part injection molding for integration into injection-molded microfluidic chips. However, such valves are active and require dedicated stepper motors both to apply sealing pressure and to rotate the valve between open and closed settings (see, e.g., Becker H et al., "A multiport metering valve technology for on-chip valving," 16*th International Conference on Miniaturized Systems for Chemistry and Life Sciences*, held on 28 Oct.-1 Nov. 2012 in Okinawa, Japan, pp. 308-10).

An alternative approach has been to create overmolded cracking pressure valves, such as those developed by Symbient Product Development, which consist of a rigid chimney feature and an elastomer stretched over it. While these valves are passive, their manufacture requires expensive equipment and significant expertise to achieve the tight tolerances necessary to avoid either leaks or unintentionally high cracking pressures.

Similarly, recently proposed designs for terminal check valves and bridge check valves for a lab on a disc, tube and sleeve check valves, and elastic slit check valves rely on elastomeric materials being precisely stretched during installation to avoid leaks or blockages (see, e.g., Al-Faqheri W et al., "Development of novel passive check valves for the microfluidic CD platform," *Sens. Actuat. A* 2015; 222:245-54; Hickerson A I et al., "Disposable miniature check valve design suitable for scalable manufacturing," *Sens. Actuat. A* 2013; 203:76-81; and Snakenborg D et al., "Polymer microvalve with pre-stressed membranes for tunable flow-pressure characteristics," *Microfluid. Nanofluid.* 2010; 10:381-8). In our hands, such valve types had a high failure rate during initial design testing due to slight variations in material thicknesses and housing assembly, limiting their usefulness for prototyping. Consequently, there is still an unmet need for normally closed, passive check valve that can easily integrate into thermoplastic devices at all stages of development, from crude lab prototypes to final production runs.

We addressed this need by laser patterning a thin orthoplanar spring made of a thermoplastic material. In this non-limiting example, the spring provided a small, adjustable amount of downward force on a soft elastomeric pad, which established a face seal against an annular boss (or ridge) surrounding a fluid supply hole (or an inlet).

Other designs have included the use of orthoplanar springs. For instance, Nguyen et al. manufactured spring valves from SU8 polymer with photolithography and demonstrated flow versus pressure responses for the valves over a limited pressure range (+/−0.06 bar) (see, e.g., Nguyen N T et al., "Micro check valves for integration into polymeric microfluidic devices," *J. Micromech. Microeng.* 2004; 14:69-75). Unfortunately, these check valves leaked slightly under back pressure. Recent uses of orthoplanar spring check valves have been limited to applications in microfluidic pumps that do not require full sealing against reverse flow and in which springs are therefore not pre-stressed (see, e.g., Cheng C H et al., "Characteristic studies of the piezoelectrically actuated micropump with check valve," *Microsyst. Technol.* 2013; 19:1707-15; and Fong J et al., "Wireless implantable chip with integrated nitinol-based pump for radio-controlled local drug delivery," *Lab Chip* 2015; 15:1050-8). Smal et al. improved upon the work of Nguyen et al. by pre-stressing the valves' SU8 orthoplanar springs to ensure adequate sealing against reverse flow while preserving minimally impeded forward flow over a much wider pressure range (+/−6 bar) than Nguyen et al. previously reported (see, e.g., Smal O et al., "Modelling, characterization and testing of an ortho-planar micro-valve," *J. Micro-Nano Mech.* 2008; 4:131-43).

Here, we present designs for these simple microcheck valves and apply them to solve three problems. First, we used check valves to stage reagent delivery into an expanding reservoir. Then, we placed two valves in series to create a finger-powered pneumatic pump. Lastly, we implemented check valves in a laser-cut chip to seal off pressurized and heated reagents for reverse transcription loop mediated isothermal amplification (RT-LAMP) of RNA from West Nile virus, a prominent mosquito-borne pathogen, as a demonstration of how the valves can add functionality to a simple device suitable for point-of-care use. We use an inexpensive, 3D printed, and portable isothermal amplification device equipped with a smart phone camera to perform robust endpoint detection of nucleic acid amplification using the quenching of unincorporated amplification signal reporters (QUASR) technique.

Valve Fabrication for Laser-Cut Devices and Integration into Machined Devices

In the check valves of this non-limiting example, each valve included three main components: a valve housing, an elastomeric pad, and an orthoplanar spring.

The first component is the valve housing, which is a disc-shaped chamber with sufficient height to accommodate the valve internals while minimizing dead volume. The bottom of the valve housing features a central inlet hole and a concentric annular boss. In addition, the valve housing typically features an outlet channel for fluid flow.

The second component is a soft elastomeric pad, which rests against the annular boss over the inlet hole and provides a high integrity face seal.

The third component is an orthoplanar spring, which is patterned from a thin sheet material and generates a restoring force when displaced normal to its surface. Unlike most previously reported orthoplanar springs used in microfluidic check valves (see, e.g., Nguyen N T et al., *J. Micromech. Microeng.* 2004; 14:69-75; Cheng C H et al., *Microsyst. Technol.* 2013; 19:1707-15; and Fong J et al., *Lab Chip* 2015; 15:1050-8), we incorporated a pre-stressed spring. A pre-stressed spring served to close the valve inlet under back pressure, while opening to forward fluid flow beyond an adjustable opening pressure.

The exemplary check valves herein feature different designs, materials, and manufacturing methods than previous orthoplanar spring valves in the literature, and are consequently better suited for use in point-of-care diagnostics. For example, we employed two different materials to fabricate the valve's pre-stressed spring and sealing pad, instead of a single material for both components. The spring can also be patterned from flat sheets of metal or plastic pre-adhered to a soft elastomer layer. Pre-stress can be implemented by using a raised boss having a surface that is above that of the spring's outer edge (e.g., of the outer edge of the substrate that supports the spring).

These design features permit independent selection of various material and structural properties of the spring and the sealing pad, thereby allowing for optimized combinations of properties that match the intended use of the valve. As a result, the valve opening pressure can be adjusted by selecting materials with different elastic moduli or thickness (e.g., as discussed herein), and the much softer elastomer pad can easily deform to effect a tight face seal.

In some non-limiting instances, the spring and the elastomeric pad can be formed from a single material, e.g., such as an elastomer, including but not limited to silicones, rubbers, and thermoplastic elastomers of varying durometer or hardness.

In other non-limiting instances, the spring and the elastomeric pad may be manufactured or produced from separate materials but as a single piece (e.g., a monolithic structure). Such a structure can be constructed in any useful manner, such as, e.g., by over molding, two-part injection molding, additive manufacturing (e.g., 3D printing of thermoset elastomers and plastics), etc. In one instance, the spring may include a metal, and the elastomeric pad may be over molded onto the metal spring. In a separate instance, the spring may be made from a 3D printed thermoset elastomer (e.g., an optical curing resin) with a particular durometer (e.g., as determined by a first Shore hardness), and the pad may be made from a separate thermoset elastomer (e.g., a optical curing resin) with a particular durometer (e.g., as determined by a second Shore hardness, such as a second Shore hardness that is less than the first Shore hardness).

In previous descriptions of orthoplanar spring check valves, pre-stressed springs were made from a single material SU8, which had to possess adequate stiffness to act as a spring but still be soft enough to seal the valve inlet. The lack of a separate, softer sealing pad precluded Smal et al. from implementing stainless steel springs in leak-free, pre-stressed check valves (see, e.g., Smal O et al., *J. Micro-Nano Mech.* 2008; 4:131-43). The versatile design herein can enable pre-stressing of springs made from flat sheets of any flexible starting material.

Yet another non-limiting feature is an annular boss (or a ridge), which is centered on the valve inlet hole. The annular boss helps achieve a tighter face seal between the elastomeric sealing pad and the valve housing, e.g., by distributing the restoring force generated by the spring over a smaller surface area on the base of the elastomer.

Furthermore, the valve can be fabricated from thermoplastics, which are the most widely used materials in disposable microfluidic assays used for point-of-care diagnostics. Previous orthoplanar spring check valves have been made from SU8, stainless steel, nickel, and parylene C (see, e.g., Nguyen N T et al., *J. Micromech. Microeng.* 2004; 14:69-75; Cheng C H et al., *Microsyst. Technol.* 2013; 19:1707-15; Fong J et al., *Lab Chip* 2015; 15:1050-8; and Smal O et al., *J. Micro-Nano Mech.* 2008; 4:131-43).

Check valves were simple to integrate into prototype devices prepared with a laser cutter. We explored three alternate approaches to integration with a laser cutter, as rendered in FIG. 5A-5B, FIGS. 6A-6B, and FIGS. 7A-7B. Valves were fabricated from thermoplastic materials (e.g., PET, PMMA, or both), which can be rapidly prototyped as devices with integrated check valves. Here, we used a $CO_2$ laser cutter, a common fabrication tool used in both academic and industrial research and development. In addition, these new valves and their components can be mass-manufactured by injection molding, die cutting, or conventional machining, yielding designs with performance likely nearly identical to those tested in early stage prototypes.

Moreover, multiple valves with different opening pressures or geometries may be incorporated into single devices by pick and place machines, adding functionality without greatly increasing device complexity. These features could be of great value to developers who wish to avoid costly redesigns when scaling up production from early prototypes. Collectively, the innovations in these check valve designs make passive, normally closed check valves more robust and easier to incorporate into disposable, thermoplastic assay devices.

Figure 5A:
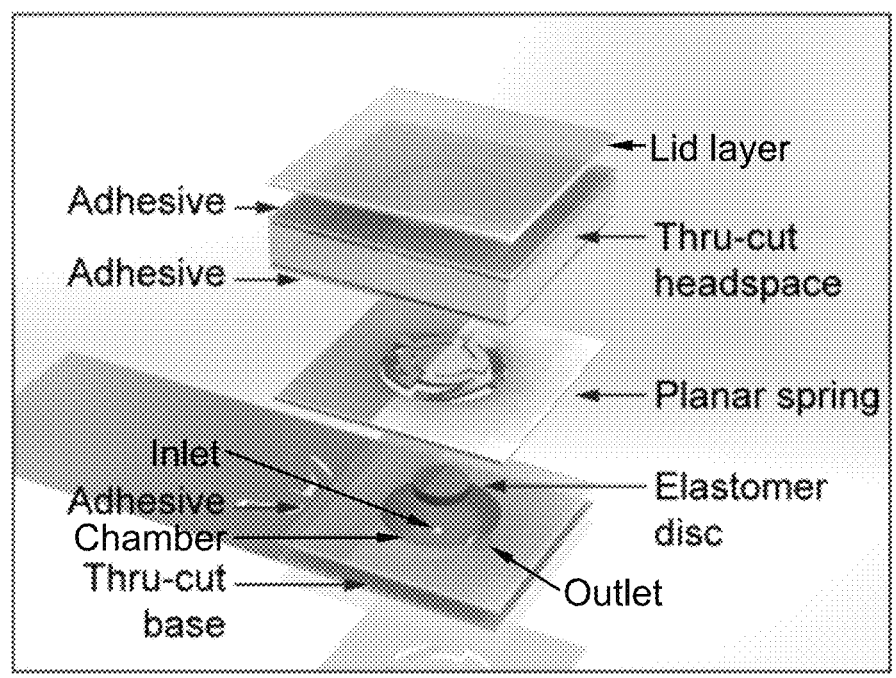
FIG. 5A-5B shows model renderings of an assembly including an exemplary check valve integrated into a housing with layer-by-layer assembled, laser cut-components. Provided is the assembly in (A) an exploded view and (B) a cross-sectional view. The housing major dimension can be of from about 1 mm to about 10 mm.
Figure 5B:
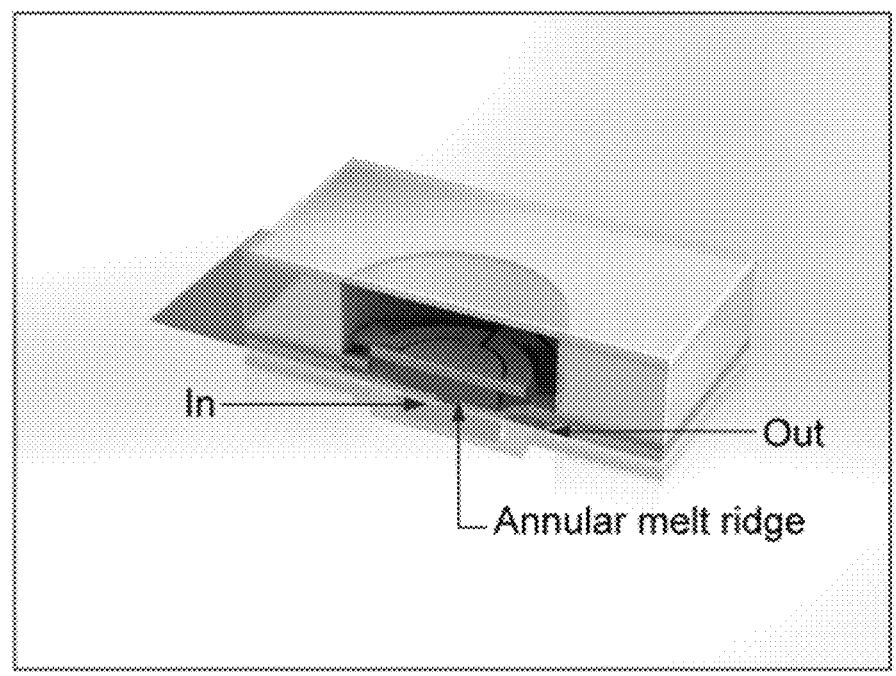

FIG. 5A-5B provides a first type of assembly: a layer-by-layer assembly. First, we patterned the features of the orthoplanar spring check valves into through-cut layers of thermoplastics and pressure sensitive adhesives, stacked to produce functional valves with a minimum of seven layers (four plastic and three adhesive), three of which were pre-assembled before cutting. A five-layer assembly is provided in FIG. 5A, the second layer includes a pre-assembly structure having three layers: an upper adhesive layer, a layer including a thru-cut headspace, and a lower adhesive layer.

Figure 8A:
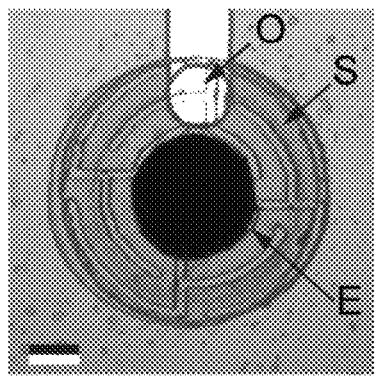
FIG. 8A-8B shows stereomicroscopic images of exemplary orthoplanar spring check valves. Provided are images of (A) valves integrated into layer-by-layer assembled, laser-cut devices, in which the springs are manufactured from different materials, such as (left) polymethyl methacrylate (PMMA) having a thickness of about 0.20 mm (measured along the z-axis, as in FIG. 1B), (middle) polyethylene terephthalate (PET) having a thickness of about 0.25 mm, and (right) PET having a thickness of about 0.13 mm. Note the presence of significant melt ridges at the edges of the PET springs. Also provided is (B) an image of a spring manufactured from PET having a thickness of about 0.13 mm, in which the spring is integrated into a machined valve housing on a larger PMMA device. Various structures are annotated, including the annular boss (or ridge) as AB, the elastomeric pad (or disc) as E, the inlet as I, the outlet as O, the press-fit plug as P, and the spring as S. Scale bars indicate 1 mm.
Figure 8A:
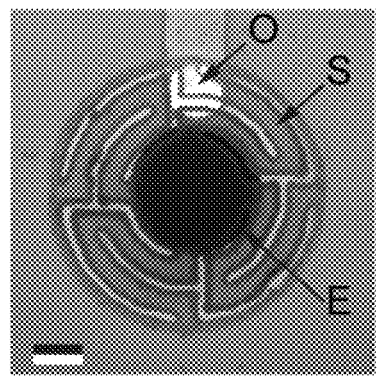
Figure 8A:
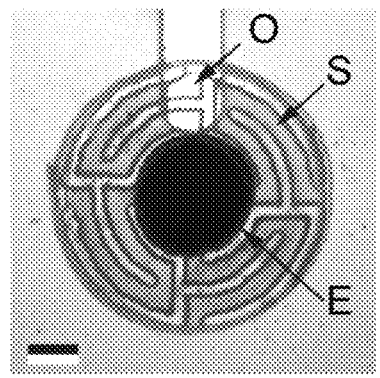
Figure 8B:
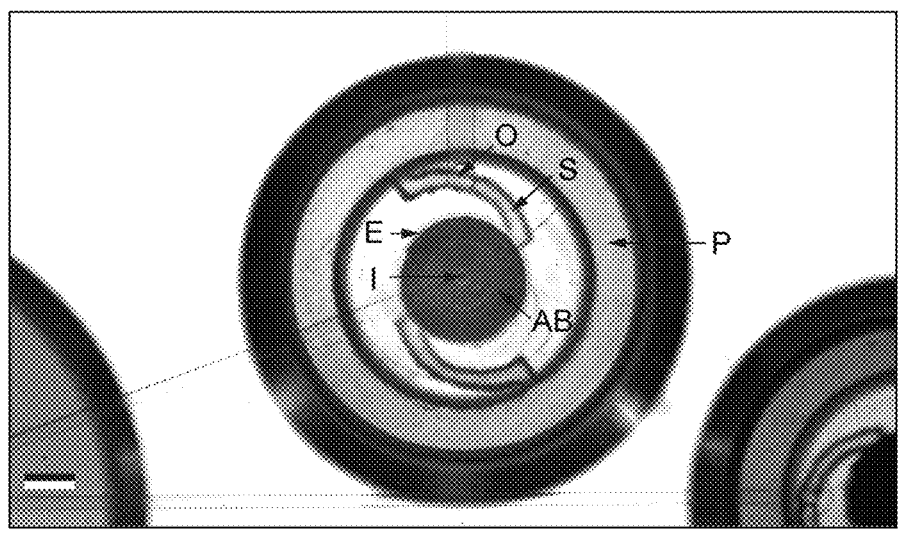

As seen in FIG. 5A-5B, a 10 A durometer silicone disc was laser cut and positioned under the patterned orthoplanar spring to pre-stress the spring and to establish a face seal around the fluid inlet hole. We noticed that cutting the valve's inlet hole layer from PET instead of PMMA was particularly effective at preventing backflow, since the laser created significantly thicker ridges of PET along cut paths (this did not occur with PMMA). This effectively created a thin annular boss for the silicone pad to press against, enhancing the seal integrity right around the fluid access hole. FIG. 8A-8B shows stereoscopic images of valves made with this approach.

Figure 6A:
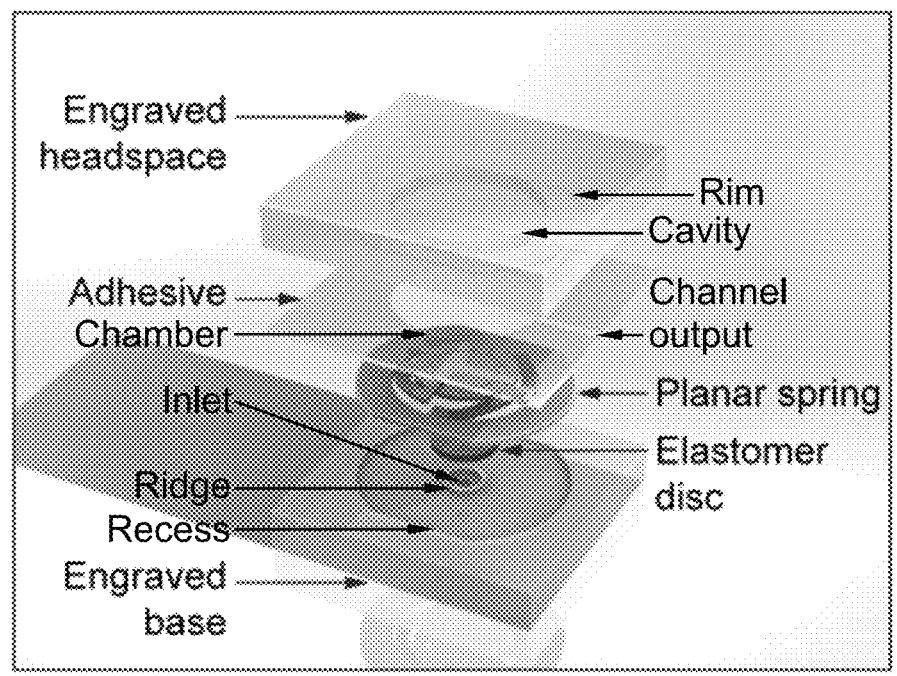
FIG. 6A-6B shows model renderings of an assembly including an exemplary check valve integrated into an engraved housing. Provided is the assembly in (A) an exploded view and (B) a cross-sectional view. The housing major dimension can be of from about 1 mm to about 10 mm.
Figure 6B:
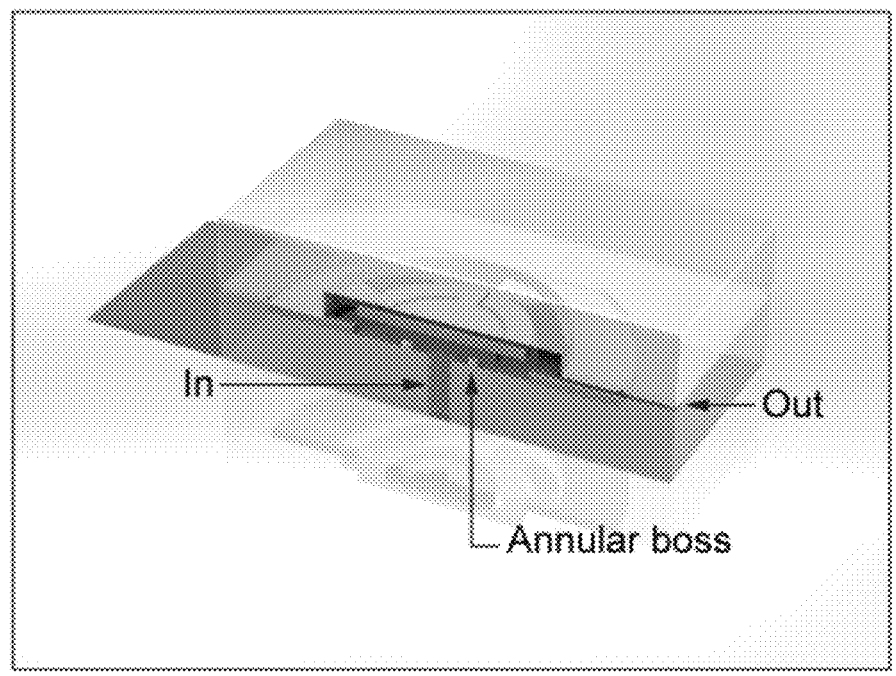

Although the layer-by-layer design provides flexibility in optimizing each layer for a particular purpose, fabrication and alignment of such designs can require stringent control. In addition, dimensions of the device can be limited by the thickness of the materials employed to fabricate each layer. An alternative approach includes a laser-engraved design, which can provide complicated fluidic features while minimizing layers. FIG. 6A-6B provides a laser-engraved valve housing, in which two opposing PMMA components (the engraved headspace component and the engraved base component) are joined together with a single layer of pressure sensitive adhesive.

In this configuration, the orthoplanar spring was fabricated as a smaller piece that was placed into the valve housing, rather than as a patterned continuous thermoplastic layer (planar spring in FIG. 6A). A surface etching around the valve headspace was employed to indicate where to place the acrylic spring onto the adhesive layer including a chamber and a channel output. We also countersank the orthoplanar spring's perimeter into the engraved base PMMA, and an uncut ring of PMMA around the inlet hole acted as an annular boss to enhance the face seal of the elastomer disc. Both the depth of the countersink and the thickness of the silicone pad contributed to pre-stressing the orthoplanar spring. This three-layer design reduced the number of crucial alignment steps and the total number of laser-cut parts required for assembly, as compared to the seven-layer valve design. The valve dead volume can be minimized more simply, e.g., by adjusting the depth of the spring countersink and headspace with commensurate adjustments in laser power. In some cases, the dead volume was further minimized by designing the headspace to match the shape of the deformed spring so that the housing was deepest only where the spring was fully displaced. The final valves also had a thinner profile, i.e., thinner than 0.6 mm.

Figure 7A:
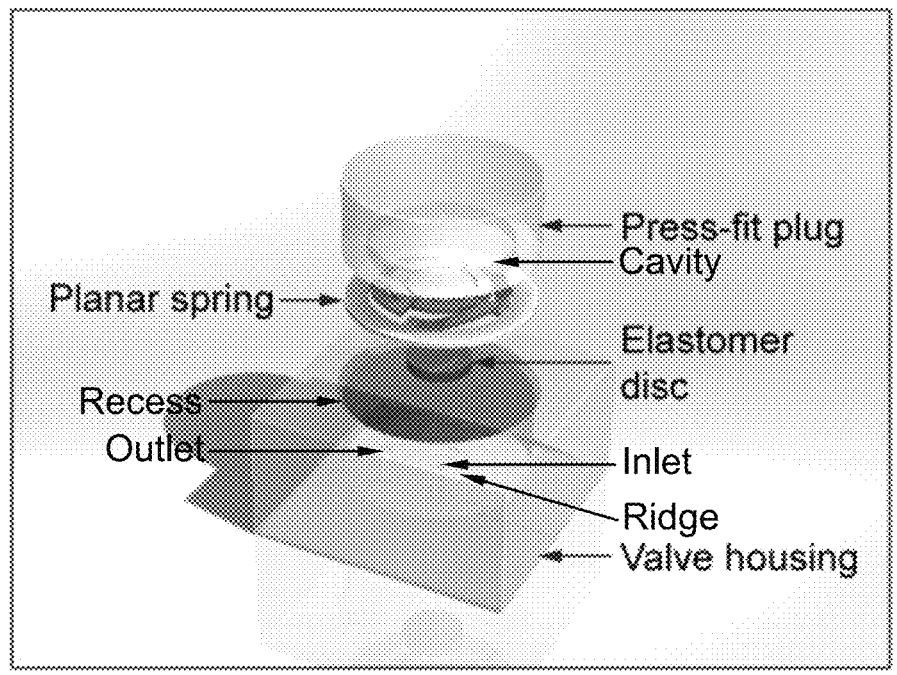
FIG. 7A-7B shows model renderings of an assembly including an exemplary check valve integrated into a machined or injection-molded housing. Provided is the assembly in (A) an exploded view and (B) a cross-sectional view. The housing major dimension was about 10 mm.
Figure 7B:
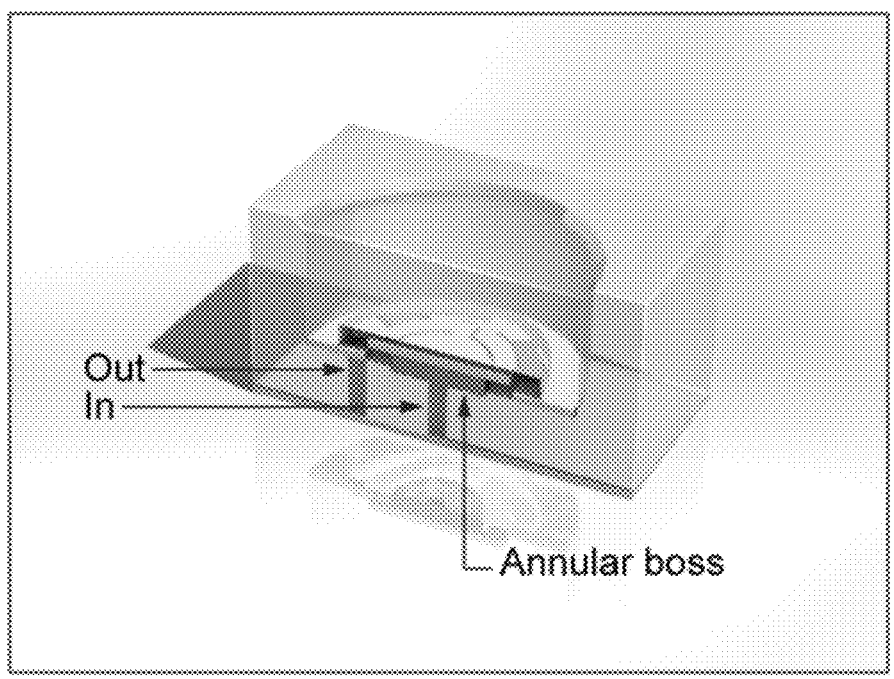

We also considered machined housings into which check valves were integrated (FIG. 7A-7B). Using conventional machining, we created a cylindrical valve housing with a central inlet hole and an offset outlet hole. A countersunk region at the center of the housing allowed for simplified positioning of the silicone sealing pad, while a small annular boss was preserved around the inlet hole to enhance sealing. In this case, a laser-cut orthoplanar spring simply placed by dropping the spring into the recess formed by the sidewall of the housing. Finally, a plug was pressed into the valve housing over the top of the orthoplanar spring, pushing the spring's perimeter flush against the base of the valve housing. Pre-stress was introduced into the spring due to the thickness of the elastomeric sealing pad, which rested against the top of the annular boss and stood proud of the valve housing floor.

Figure 13:
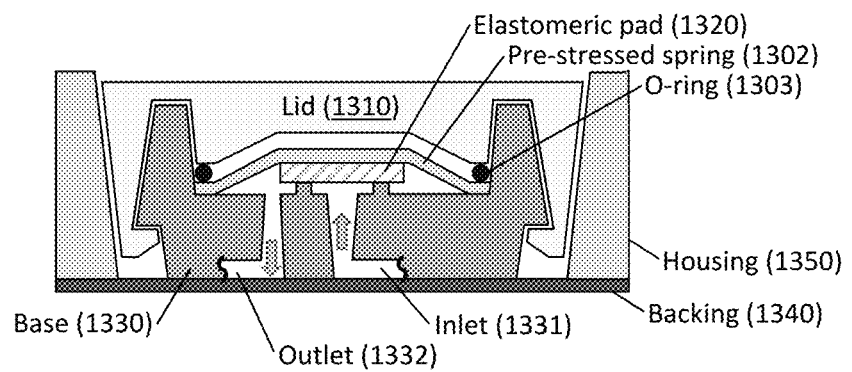
FIG. 13 shows a cross-sectional view of another exemplary check valve including an injection moldable, snap fit valve with an O-ring 1303 to seal the lid 1310 within the housing 1350.

FIG. 13 provides another housing configuration including an injection molding compatible, snap fit design. The device includes a pre-stressed spring 1302 and an elastomeric pad 1320. The device also includes a base 1330 to define fluidic features (e.g., an inlet 1331, an outlet 1332, a chamber, etc.), which can optionally be formed in conjunction with the housing 1350 (e.g., at the same time and/or with the same material). A snap fit lid 1310 (or cap) and a thin laminated backing 1340 are employed to seal fluidic features, and an O-ring 1303 can further ensure a gas tight seal. In some non-limiting embodiments, one or more vertical edges of the components are drafted (e.g., angled) to reflect drafting requirements for ejection of the plastic or thermoplastic parts from the mold tooling.

In the machined valve housing, the quality of the seals were visualized by pressing the elastomeric disc against the annular boss in machined valve housings using an optical microscope. The silicone pad pressed against the annular boss displayed a smooth appearance, indicating that it had deformed to make a perfect seal against the smooth PMMA valve housing (FIG. 8B). Here, controlling the depth of the press-fit plug's central depression minimized the check valve's dead volume. Despite initial development in laser-cut assemblies, our check valves integrated easily into machined housings.

Various patterns were considered for the orthoplanar springs fabricated from multiple materials. We prepared springs from thin sheets of both PET and PMMA using identical CAD drawings and minimal variations in laser cutting parameters. As mentioned previously, we noted that ridges formed along the cut edges of PET materials. In patterned springs, this had the effect of creating a dumbbell shaped cross section in the patterned beams of the spring. In contrast, PMMA retained a roughly rectangular cross section when patterned into a spring with the laser. With some brief experimentation, we found that the melt ridges could be reduced in PET springs by transferring a protective, no-tack adhesive film from sheets of PMMA to the PET prior to laser cutting. Without wishing to be limited by theory, it is likely that the protective film helped rapidly redistribute heat away from the laser cut site to achieve this effect. In both materials, the minimum cutting thickness of the laser beam was approximately 100 µm with our equipment, and parallel cuts had to be spaced at least 0.5 mm apart to avoid unintentional joining. We expect that finer features could be achieved with a more precise laser cutter or alternative fabrication techniques. Nevertheless, the methods we employed produced consistent valves with a thin profile (<0.6 mm) and low dead volume (<5 µL).

These check valve designs were simple and amenable to scale-up. We successfully designed and tested a passive check valve that easily integrated into laser-cut devices assembled layer-by-layer with contact adhesives, as well as into machined monolithic devices with patterned valve housings amenable to production by injection molding. Importantly, we found that valve performance was identical in crude, rapid prototype devices made with a laser cutter and in high-quality monolithic devices prepared by conventional machining. This was because the sealing mechanism of the combined planar spring and elastomeric disc was the same irrespective of the construction method used to prepare the valve housing. The adaptability of the check valve's design could be useful in accelerating the transition of early stage devices to developed products, since valve re-design would not be needed to preserve compatibility with scale up manufacturing.

Valve Performance and Impact of Valve Design Parameters on Opening Pressure

Valve designs were optimized to allow for ease in adjustability. For instance, one application may require a check valve with low opening pressure. In another instance, perhaps even in the same device, a check valve with high opening pressure might be required (e.g., a pressure release valve). Similarly, some applications may require the use of a specific type of plastic for the valve housing and spring. If the required plastic were stiffer or less stiff than that used in earlier valve tests, one should be able to quickly alter a few key parameters to recover the desired valve behavior. A key feature of the present valve design is the versatility of the pre-stressed orthoplanar spring to provide this functionality and flexibility. We have found these valves to be consistent, reliable, and easily adjustable in both crude laser cut prototypes and more polished machined microfluidic devices.

Figure 9A:
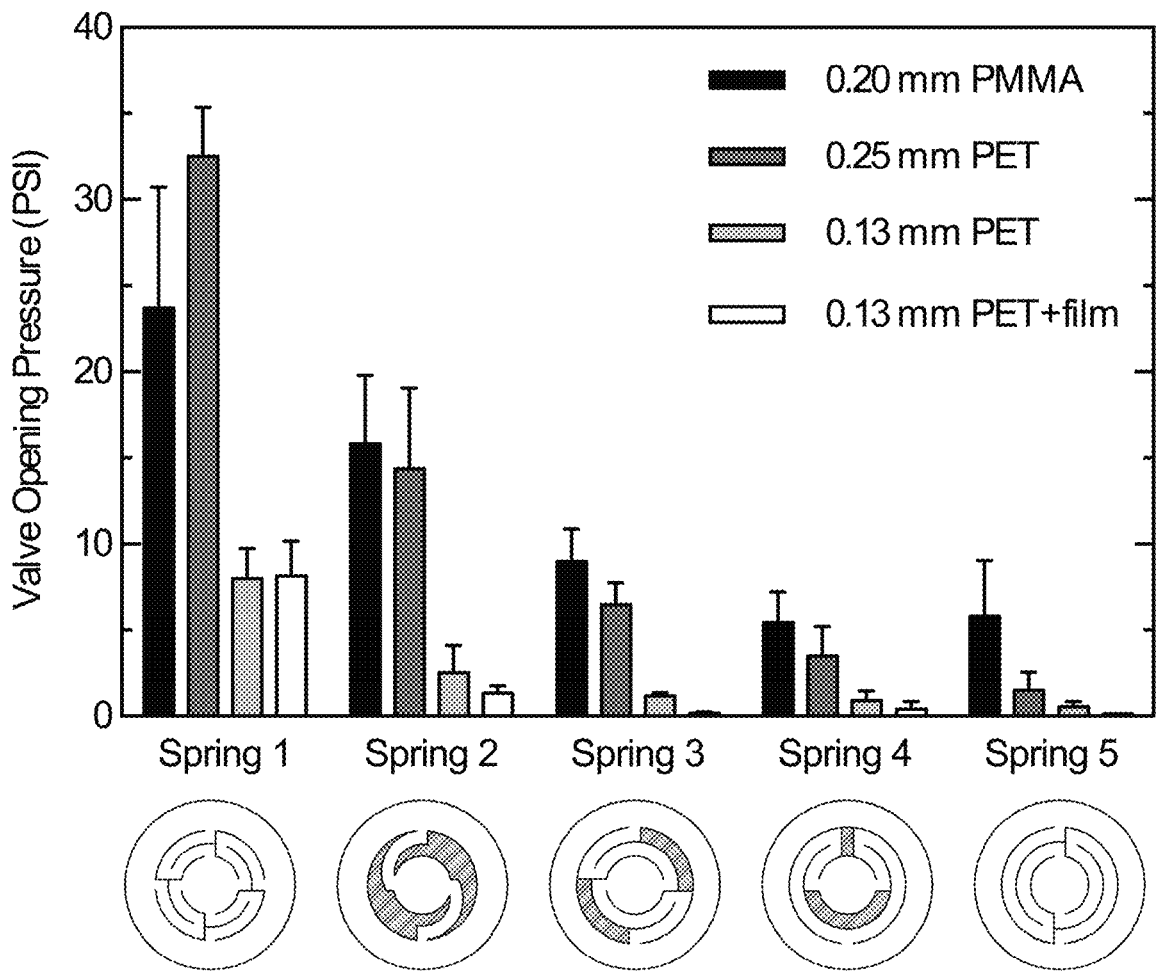
FIG. 9A-9B shows exemplary valve structures and measured valve opening pressure. Provided is (A) a graph showing valve opening pressures under forward pressure as a function of spring design (i.e., Spring 1, 2, 3, 4, or 5) and as a function of the material for the planar substrate in which the spring is patterned (i.e., PMMA, PET, or PET with a protective film). Spring patterns are shown underneath their corresponding data and name designation. Experiments were performed with triplicate measurements from at least six independently constructed valves. Valves were considered open when pressurized air was seen to pass through the valve outlet into soapy water, creating small bubbles. Also provided is (B) a schematic of a planar substrate 901 with a patterned spring having four beams 931,932,933,934.

Nguyen et al. previously presented designs to create six orthoplanar springs with varying stiffness out of SU8 by photolithography (Nguyen N T et al., *J. Micromech. Microeng.* 2004; 14:69-75). In contrast, our design allowed for wide adjustability through the selection of orthoplanar spring pattern, spring material stiffness, and spring thickness. FIG. 9A provides opening pressures for laser-cut and layer-by-layer assembled valves featuring different orthoplanar springs made from PMMA and PET materials. Here, we adapted the valve designs for fabrication with a laser cutter. As can be seen, the spring pattern chosen for the valve can be used to dramatically tune the check valve's opening pressure. For example, when cut from 0.25 mm PET, spring 1 opens at an average of 32 PSI, while spring 5 opens at around 2 PSI. This is accomplished by effectively adjusting the length of the beam from a fixed end that is connected to the perimeter of the spring to a guided end that is connected to the spring's central support, which is in contact with the elastomeric sealing pad.

Figure 9B:
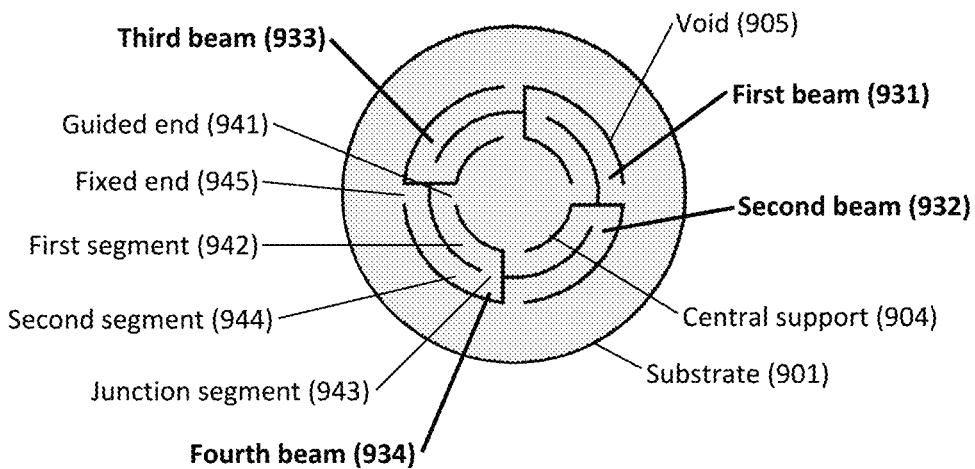

FIG. 9B provides various structural elements of the spring, which includes four beams 931,932,933,934. Each beam is defined by a void 905 engraved into the substrate 901, and each beam is distributed around a central support 904. Furthermore, each beam includes a guided end 941 connected to the central support 904, a fixed end 945 connected to a periphery of the substrate 901, a first segment 942 and a second segment 944 disposed between the two ends 941,945, as well as a junction segment 943 located between the first and second segments 942,944. The junction segment 943 can be used in include a turn or a meander within the beam, thereby allowing for a longer length within the prescribed surface area of the substrate 901.

The stiffness of the plastic used to create the spring can affect the valve opening pressure. For instance, most of the springs made from 0.2 mm thick PMMA opened at higher pressures than springs made from thicker 0.25 mm PET, which can be even thicker along their edges due to a melt ridge. This is because the elastic modulus of PMMA is typically higher than that of PET materials.

Finally, the thickness of the PET can be optimized to create orthoplanar springs having the desired valve opening pressure. The stiffness of a cantilever beam is known to be proportional to the beam's moment of inertia. For a beam with a rectangular cross-section, the moment of inertia is proportional to the cube of the thickness. Thus, thinner materials should make much more compliant springs that open at lower pressures. Indeed, we observed that springs made from 0.13 mm thick PET opened at much lower pressures than equivalent springs cut from 0.25 mm thick PET. With the thickness halved, one might expect an approximately 8-fold reduction in opening pressures. We observed a less dramatic drop in opening pressures, however, between 3-fold to 5-fold. This could be due to a number of factors, including the dumbbell-shaped cross section of the PET springs due to melting. Using digital calipers, we determined that the thickness of the melt ridge was nearly double that of the base PET. We tested how significantly the melt ridge affected valve opening pressures by replicating the 0.13 mm thick PET valves using springs that were cut from a PET sheet covered with a protective cover layer that helped to spread heat away from the cut site and minimize melt ridge formation. As seen in FIG. 9A, the PET+film springs opened at lower pressures than springs with melt ridges for all spring patterns, except the design for spring 1.

Valve parameters with less impact on opening pressure included inlet hole diameter, silicone stiffness (durometer), and silicone thickness. We expected that larger inlet holes under the silicone sealing pad could reduce the amount of forward pressure required to open the check valve to forward flow, since a lower pressure over a proportionally larger area should generate an equivalent force on the elastomer, and by extension, the orthoplanar spring. However, we tested valves with inlet holes ranging between 0.25 mm and 1.5 mm in diameter and observed minimal effect on valve opening pressure. This observation was made with valves assembled layer-by-layer from laser-cut materials (FIG. 5A-5B). It is possible that varying the inner diameter of the annular boss featured in either the laser-engraved or machined valve housings could have a bigger impact on valve opening pressure.

Additionally, we found that changing the silicone durometer from 10 A to 30 A had minimal to no effect on mean opening pressure, but did increase the variability of opening pressures. Increasing silicone stiffness to 40 A resulted in unacceptable opening pressure variability and poor leak performance under back pressure in laser-cut valves without an annular boss. In general, soft, easily deformable silicone delivered the best leak-proof and consistent opening performance. For valves prepared with 10 A silicone sealing pads, back pressure never resulted in leaks, and the contact adhesives used to assemble valve housings failed before the valve seal itself.

Finally, we found that increasing silicone pad thickness, and thus the pre-stress in the spring, increased the valve opening pressure. Based on limited observations with three thicknesses of 10 A silicone, opening pressure increased approximately 0.0016 bar/μm (0.6 PSI/thou) of additional spring displacement (tested with a 0.25 mm PET thick spring having a design shown for spring 1), making them quite tolerant to slight variations in silicone thickness.

Staged Delivery of Onboard Reagents and Finger-Actuated Pumping

Onboard reagent storage, staged fluid delivery, fluid metering, and pumping are often enabled by single use valve-like features in hand-operated disposable diagnostics. For example, most onboard reagent storage in point-of-care diagnostics is accomplished with blister packs or frangible seals, i.e., single use features that rely on a designed failure of the reagent reservoir when pressure is applied, sending fluid through the breached seal into the assay cartridge. Similarly, staged fluid delivery is usually accomplished with capillary valves, which "burst" open when a triggering fluid flows past. While these features are elegant solutions to specific problems, they lack the full functionality provided by a normally closed passive check valve. For instance, blister packs cannot reseal after dispensing a portion of their contents, nor can they prevent downstream fluids from reentering the breached blister. In addition, capillary burst valves cannot close once they have been triggered and do not provide one directional flow. In contrast to the frangible seals and capillary valves incorporated into rigid thermoplastic devices, check valves incorporated into hand-operated PDMS devices can possess greater functionality. Here, we demonstrate that orthoplanar spring check valves offer the full functionality of traditional check valves for reagent storage and isolation, as well as fluid metering and pumping in thermoplastic devices.

Figure 10A:
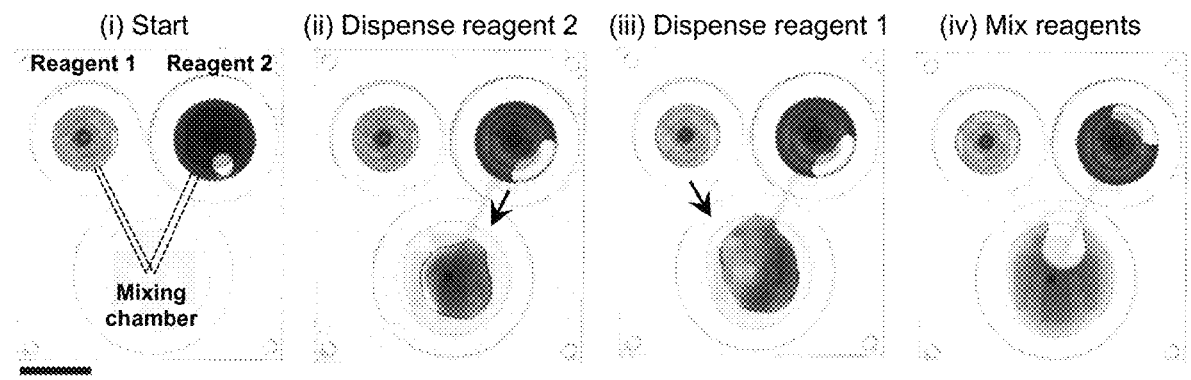
FIG. 10A-10B shows images of check valves for sequential delivery or pumping. Provided is (A) a sequence of photographs demonstrating onboard storage of fluid reagents (reagents 1 and 2) and finger-actuated, sequential delivery of different fluid volumes to a common mixing chamber. The device is a laser cut and engraved PMMA apparatus with two check valves, in which a check valve is associated with each reagent reservoir. Check valves were employed to seal each reagent reservoir from the pressurized downstream mixing chamber. Channels (dashed lines) fluidically connected each reagent reservoir to the mixing chamber. Scale bar indicates 1 cm. Also provided is (B) a sequence of multimedia view images showing finger-actuated pumping of air and fluid into a microfluidic frog throat apparatus. Air moves through the right nostril (having a check valve indicated with a $V_1$) and into the eyes (the top two clear chambers having an elastomeric membrane, which are indicated with an E), which are depressed to move the air through a second check valve (indicated with a $V_2$) and to fill the throat (lower gray chamber having an elastomeric membrane, which is indicated with an E). Scale bar indicates 2 cm.

We prepared finger-operated devices with a laser-cutter that stage fluid delivery from onboard reagent storage reservoirs, as shown in FIG. 10A. We employed the engraved check valve design (as seen in FIG. 6A-6B) with a 0.2 mm thick PMMA spring having a design shown for spring 3 in FIG. 9A. As such, the check valves sat at the interface between two pieces of PMMA, which formed the chip base. We engraved the valve housing's headspace to match the shape of the spring, thus minimizing dead volume. We then created reagent storage reservoirs by adhering clear silicone to a ring of PMMA. The reservoirs were filled with yellow or blue food coloring prior to adhering them to the chip base over the valves with pressure sensitive adhesive. A common chamber downstream from the valve was prepared by cutting channels out of the chip base's middle adhesive layer and gluing clear silicone directly onto the top surface of the chip base.

Before actuation, the laser-cut check valves kept the yellow and blue food coloring in place in their storage reservoirs (FIG. 10A(i)). Using a finger, we first pressed on the blue reservoir, sending blue food coloring into the common downstream chamber, which expanded and filled with blue fluid (FIG. 10A(ii)). The passive sealing action of the check valve ensured that the silicone covering the blue reservoir remained depressed, while the silicone covering the common downstream chamber remained expanded when the finger was removed. Crucially, no blue food coloring entered the yellow reservoir. Next, we dispensed yellow food coloring into the common chamber by pressing on the yellow reservoir (FIG. 10A(iii)). The volume of yellow food coloring dispensed was smaller than that of blue food coloring due to the smaller size of its reagent reservoir. A similar approach might be used to accomplish volume metering with these valves. Despite the increased pressure in the common chamber, neither yellow nor blue food coloring moved back into the yellow or blue reservoirs.

When we pressed repeatedly on the now swollen common chamber to mix the blue and yellow food coloring (FIG. 10A(iv)), the valves entirely prevented backflow through the valves. In fact, we observed that the fairly strong cyanoacrylate adhesive holding the clear silicone to the PMMA chip base began to fail following aggressive mixing with a finger while the valves' integrity and reagent reservoirs' contents were unaffected. An important advantage of our check valve over frangible seals or capillary valves for dispensing onboard reagents is that each valve is self-sealing once fluid has been dispensed. This prevented backflow of the same or other reagents from downstream reservoirs into the reagent storage reservoir. Therefore, these check valves enabled fluid delivery to pressurized chambers and staged reagent delivery without unwanted mixing. Unlike rotary multiport valves, no external actuation is required to achieve this isolation.

Figure 10B:
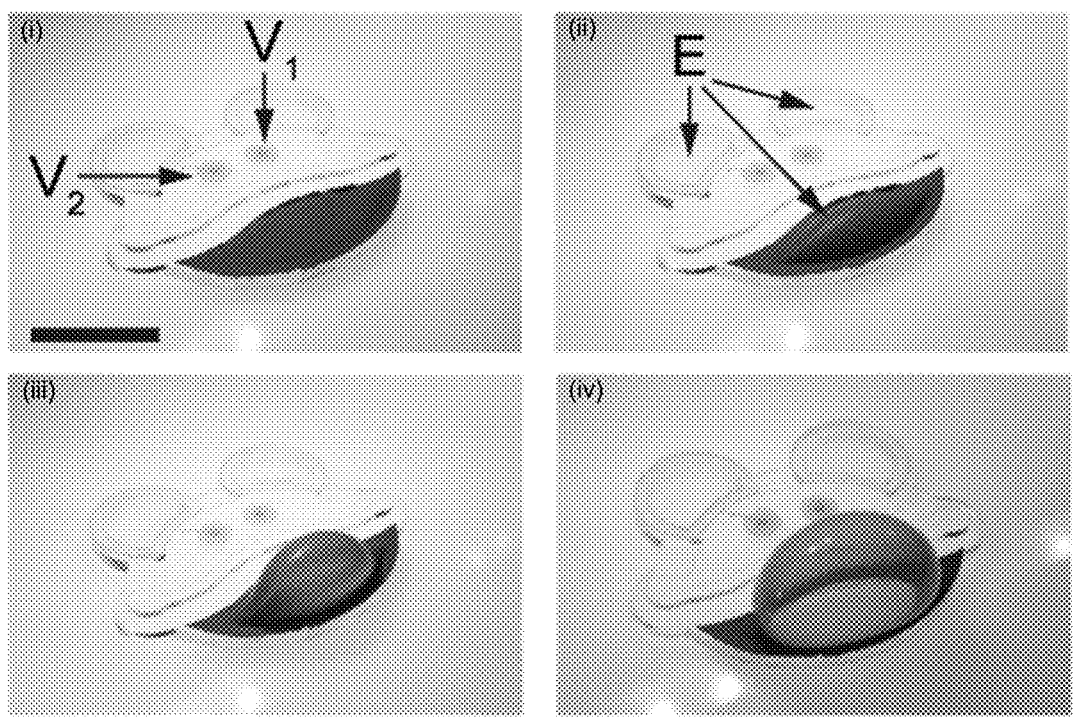

The pre-stressed orthoplanar spring valve can be employed to provide a gastight valve seal. We placed two check valves in series to create a finger-operated pump resembling a cartoon frog (FIG. 10B). Like a real frog, the device breathed in air through a "nostril" and used this air to pressurize a "throat", which distended until it eventually popped. The pump included an inlet hole (at valve 1 in FIG. 10B(i)), a deformable air chamber (the two eyes, covered with clear silicone and connected via channels cut in an adhesive layer, indicated with an E pointing to two clear regions in FIG. 10B(ii)) flanked by two laser-engraved check valves (valves 1 and 2, indicated with $V_1$ and $V_2$ in FIG. 10B(i)), and a distensible air chamber covered in a soft grey silicone (the gray throat pouch in FIG. 10B(ii)).

To operate the pump, we first pressed on the two eyes simultaneously, increasing pressure in the pumping chamber. Since valve 1 seals passively against backflow, air was pushed through valve 2 into the distensible air chamber. This gave the appearance of the frog inflating its throat (FIG. 10B(iii)). We then removed our fingers, allowing the tension in the clear silicone "eyes" to draw air into the pumping chamber through valve 1 (the right nostril). The inflated throat did not decrease in size, demonstrating that our check valves form gastight seals against reverse flow.

After waiting a few seconds, we then pushed on the eyes again, further inflating the frog's throat (FIG. 10B(iv)). We repeated this process until the soft silicone was completely transparent and stretched to over 500% strain based on curve length measured from side-view images. Shortly thereafter, the frog croaked—its silicone throat had ruptured. In conclusion, we demonstrated that laser-cut passive check valves, also amenable for mass-manufacture and integration into injection molded devices, can be arranged in a simple fluidic circuit to form a one-directional pump.

Application of Valves to Sealing a Device for RT-LAMP Detection of West Nile Virus One of our research interests is developing microfluidic systems for fully automated detection of vector-borne disease in the environment or at the point-of-care. In particular, we aim to use isothermal nucleic acid amplification techniques to detect RNA or DNA from viruses carried by mosquitoes.

In one instance, the target is the West Nile Virus (WNV), which poses a significant health risk to people, livestock, and wildlife, killing many each year. In the laboratory, we combined crushed mosquito samples acquired in the field or purified WNV RNA with a standard reagent mix for reverse transcription loop mediated isothermal amplification (RT-LAMP) and heated the mixture in polypropylene tubes to a constant 65° C. for 30 minutes. The resulting amplification of target nucleic acids results in a bright fluorescent signal when the reaction is cooled back to room temperature, due to our recently developed detection chemistry known as QUASR (quenching of unincorporated amplification signal reporters). Negative reactions remain dark.

We adapted a device with microcheck valves to perform a RT-LAMP bench-technique. Manually conducted QUASR RT-LAMP at the bench requires pipetting a defined volume of reagents into the polypropylene tube and then sealing the tube with a snap cap to prevent sample evaporation and contamination of the laboratory environment with amplicon. Furthermore, the sample must be heated both from below to maintain constant reaction temperature and from above to prevent evaporation and condensation of the sample onto the lid. While developing microfluidic assays to automate QUASR RT-LAMP detection of WNV in the field, we used orthoplanar spring check valves to fill unvented reaction chambers with reagents under pressure, which reduced sample evaporation, and to passively seal the reaction chambers from the rest of the chip and the external environment. Since the orthoplanar spring valves were made with a laser-cutter, we were able to test our valving strategy in laser-cut prototype chips for QUASR RT-LAMP detection of WNV RNA early in the design process.

Figure 11A:
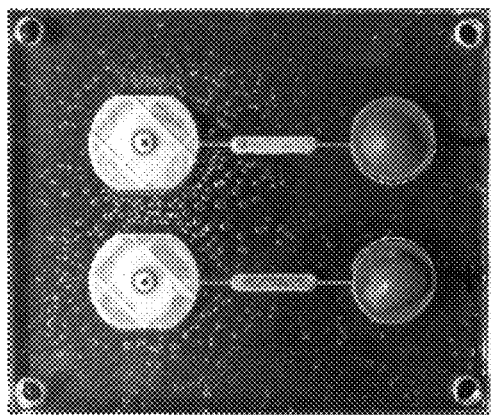
FIG. 11A-11B shows photographs of an exemplary fluidic cartridge for West Nile virus (WNV) detection. Provided are (A) a photograph of the cartridge showing a check valve in fluidic communication with a reaction channel that ends with an expandable, silicone layer and (B) a fluorescence emission photograph showing negative (top) and positive (bottom) detection of WNV RNA using reverse transcription loop mediated isothermal amplification (RT-LAMP).
Figure 11B:
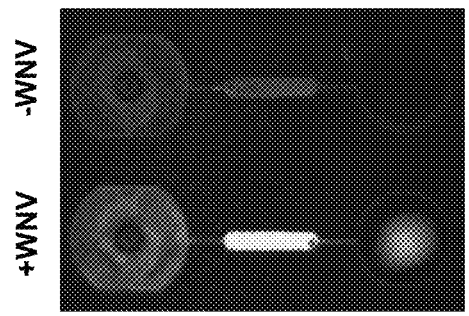

In particular, we prototyped chips from two layers of laser-etched PMMA (FIG. 11A) and used them to detect WNV RNA with isothermal amplification (FIG. 11B). The devices were filled with reagents by pipetting reagents over the valve openings and then pressurizing the headspace around the valves with a gasketed syringe. Check valves were used to seal off a fluidic chamber featuring a silicone end, which expanded during filling to reduce pressure that would otherwise lead to failure of the pressure sensitive adhesive during the heated incubation step. Other chip designs can be employed (e.g., FIG. 12A-12C). Chips were then placed on a heat plate at 65° C. for 30 minutes before cooling to room temperature. Then, an LED and camera fitted with excitation and emission filters were used to visualize positive amplification. These devices accurately and reliably detected WNV using endpoint detection, and prevented contamination of the lab space with amplicon. The use of the passive, normally closed check valves enabled a single actuation step (e.g., pressurizing the sample fluid) to fill the chip, seal the chip, and minimize evaporation under heating.

In conclusion, we identified designs for normally closed, passive check valves that are "native" to laser-cutter prototyping, but can be seamlessly integrated into machined chips and should integrate identically into injection molded parts without having to redesign the system around a new type of valve. The check valves employed a pre-stressed orthoplanar spring to press a soft elastomeric sealing pad against an annular sealing surface. The design is inherently adaptable, supporting multiple spring materials and offering adjustable opening pressure by simply modifying orthoplanar spring pattern. These check valves provide new opportunities to design staged reagent delivery and functionality into laser-cut prototype point-of-care diagnostic devices, as well as commercial stage diagnostics.

Example 4: Exemplary Polycarbonate Chip

Figure 12A:
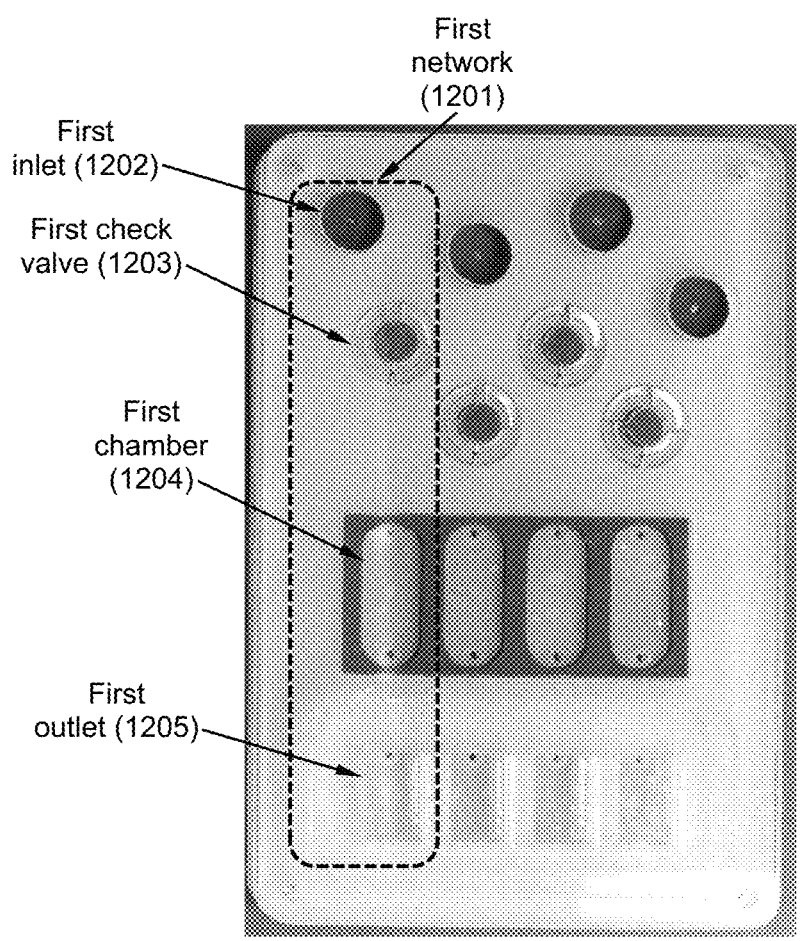
FIG. 12A-12C shows photographs of exemplary fluidic cartridges. Provided are (A) a first exemplary cartridge configured to conduct multiple, separate reactions on the same cartridge, in which four separate samples can be introduced in each separate fluidic network; (B) a second exemplary cartridge configured to house two check valves and to conduct parallel analysis of the same sample fluid on the same cartridge; and (C) a third exemplary cartridge configured to conduct parallel analysis.

Microfluidic chips can be manufactured with the check valves of the invention, as well as other fluidic components to control and direct sample and reagent flow. In addition, such chips can be adapted to conduct parallel assays, in which the same assay can be performed on different samples in a parallel manner or in which different assays can be performed with the same sample in a parallel manner. Serial assays can also be conducted. As seen in FIG. 12A, an exemplary device includes a plurality of networks, in which a first network 1201 includes a first inlet 1202 to introduce a sample to the fluidic network, a first check valve 1203 to provide unidirectional flow through a channel in fluidic communication with the first chamber 1204, and a first outlet 1205.

Figure 12B:
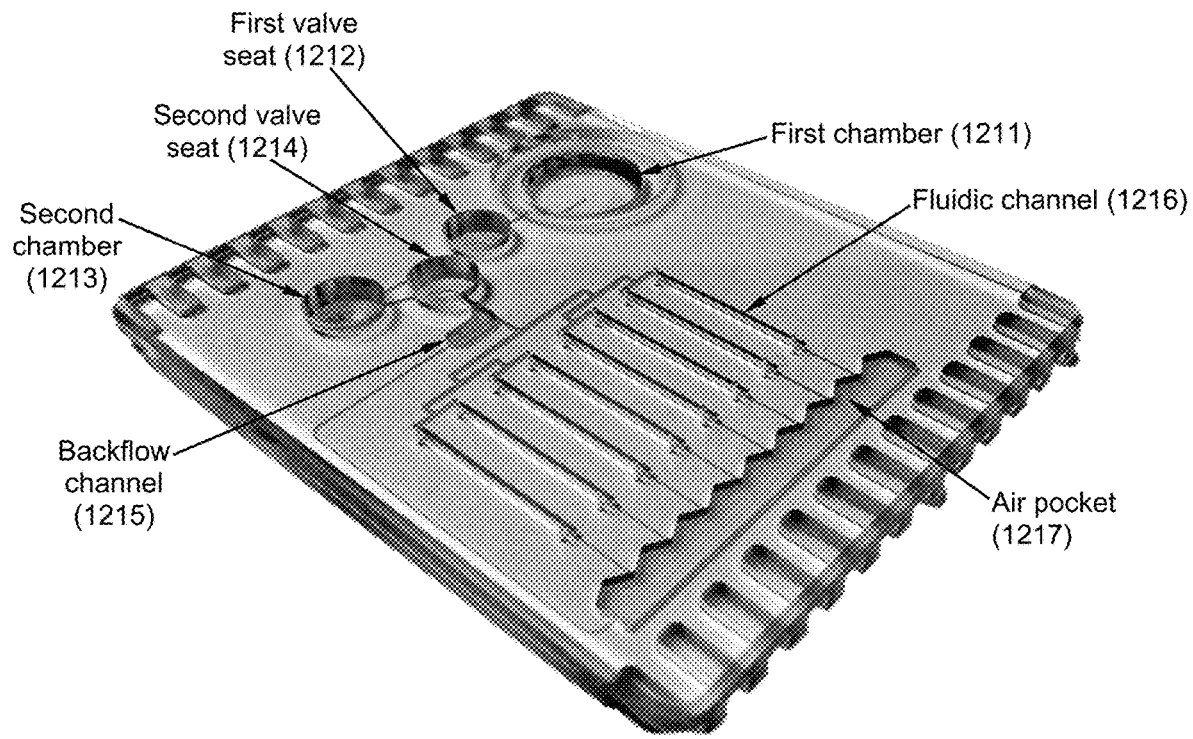

In some instances, pressure-driven flow is applied, and one or more flow restrictors, backflow prevention channels, and passive valves can be employed on-chip to facilitate fluid flow. In addition, external machined tracks can be employed on the device to engage a timing belt. FIG. 12B shows an exemplary device having a first chamber 1211 in fluidic communication with a second chamber 1213, as well as a first valve seat 1212 and a second valve seat 1214 between these chambers 1211, 1213 to facilitate unidirectional flow from the first chamber 1211 to the second chamber 1213. The valve seats are configured to accommodate a valve (e.g., a drop-in valve including a pre-stressed orthoplanar spring).

Fluid entry into the main fluidic channels 1216 (e.g., reaction channels) can be controlled by way of a backflow channel 1215 to prevent excess fluid accumulation at the junction. In addition, the device can be self-contained, in which dead-end filling is employed by having an air pocket 1217 providing a dead-end within the device. Pressure-driven flow is controlled in the following manner, in which the pressure difference between an input and the air pocket facilitates filling of the fluidic channels 1216 until the pressure difference equalizes.

Figure 12C:
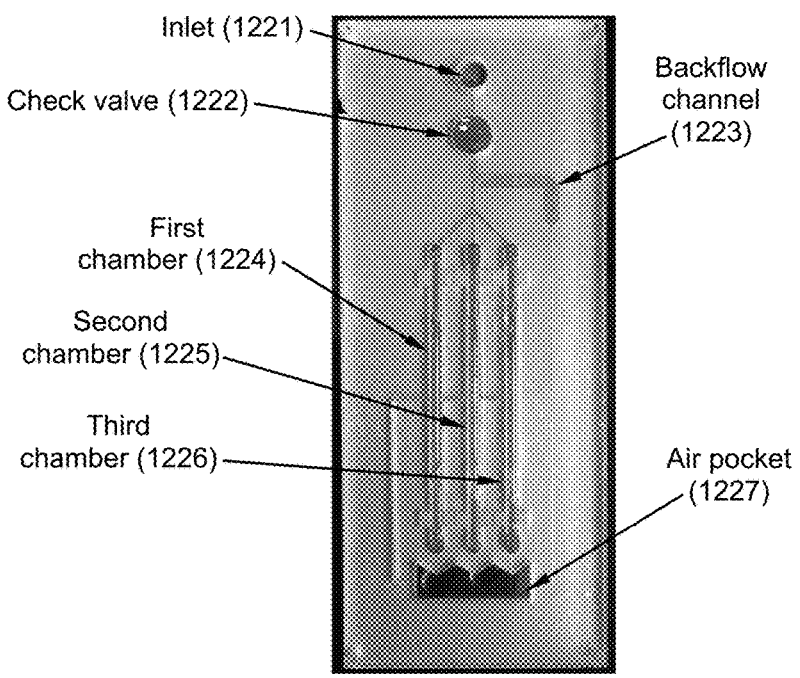

FIG. 12C provided another exemplary device to perform parallel assays. The device includes an inlet 1221, a check valve 1222, a backflow channel 1223, three chambers 1224, 1225,1226 that splits from the main channel, and an air pocket 1227. Other fluidic networks can be implemented by designing components, chambers, and valves to provide a particular fluidic network.

Example 5: Detection of WNV RNA

Figure 14A:
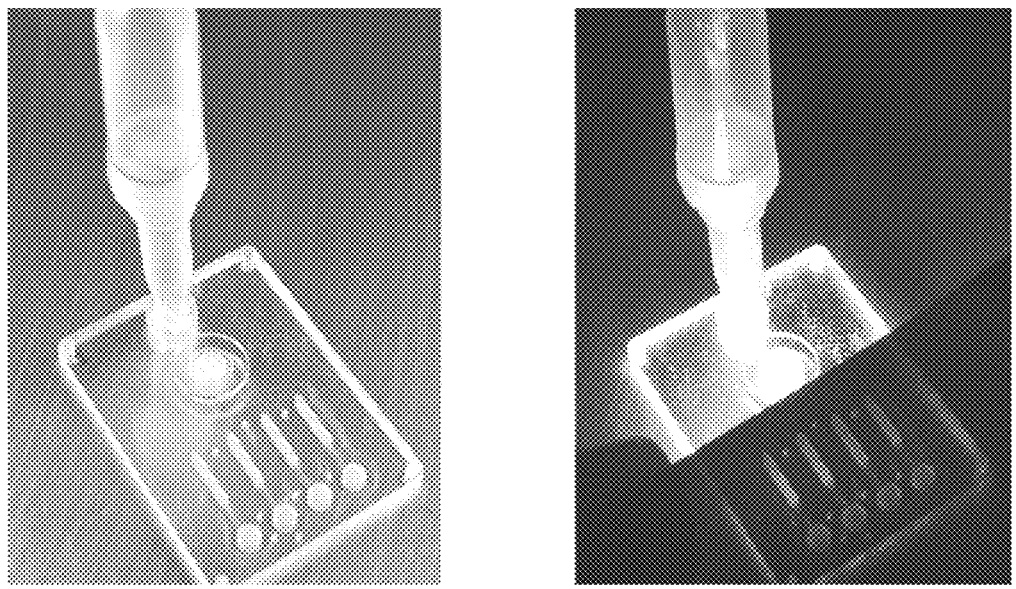
FIG. 14A-14C shows valves applied to WNV detection. Provided are images of a laser cut prototype device with integrated sample holder and squeeze pipette bulb cap, in which images include a photograph taken in room light after running QUASR RT-LAMP (FIG. 14A, left) and another photograph of the same device illuminated with a green LED flashlight and viewed through a plastic filter (FIG. 14A, right). The first two channels were positive, and the last two were negative for WNV. Also provided are images of the chip taken during different stages of use: dry, filled with rehydration buffer and sample, heated during the RT-LAMP reaction, and cooled to 20° C. after 30 minutes at 65° C.
Figure 14B:
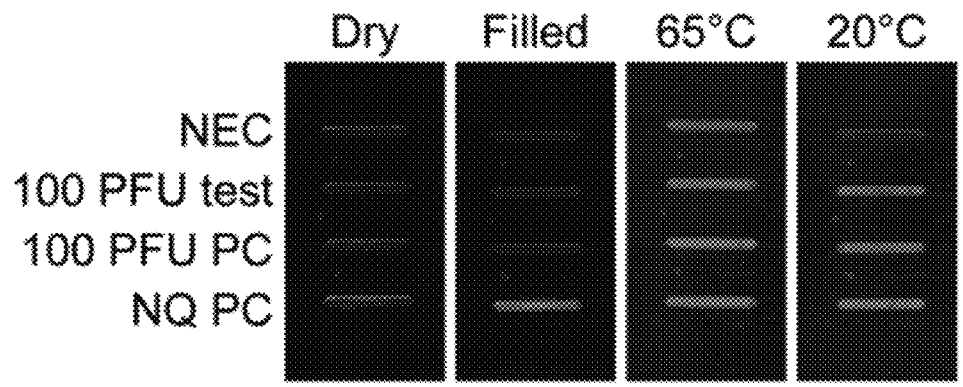
Figure 14C:
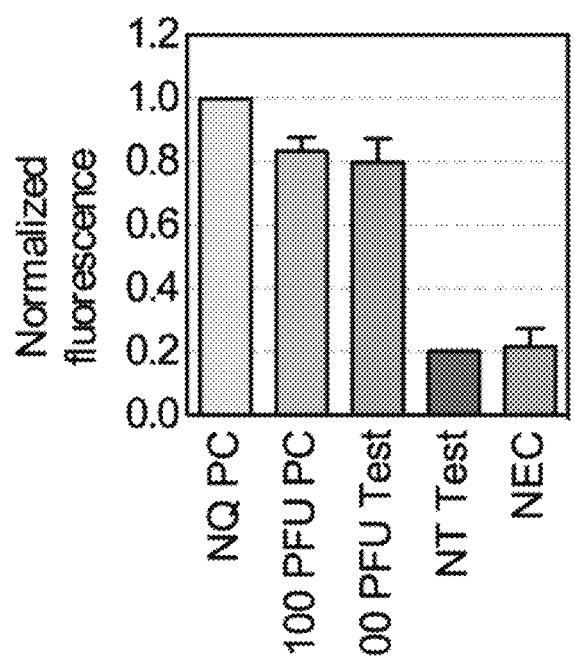
Figure 15A:
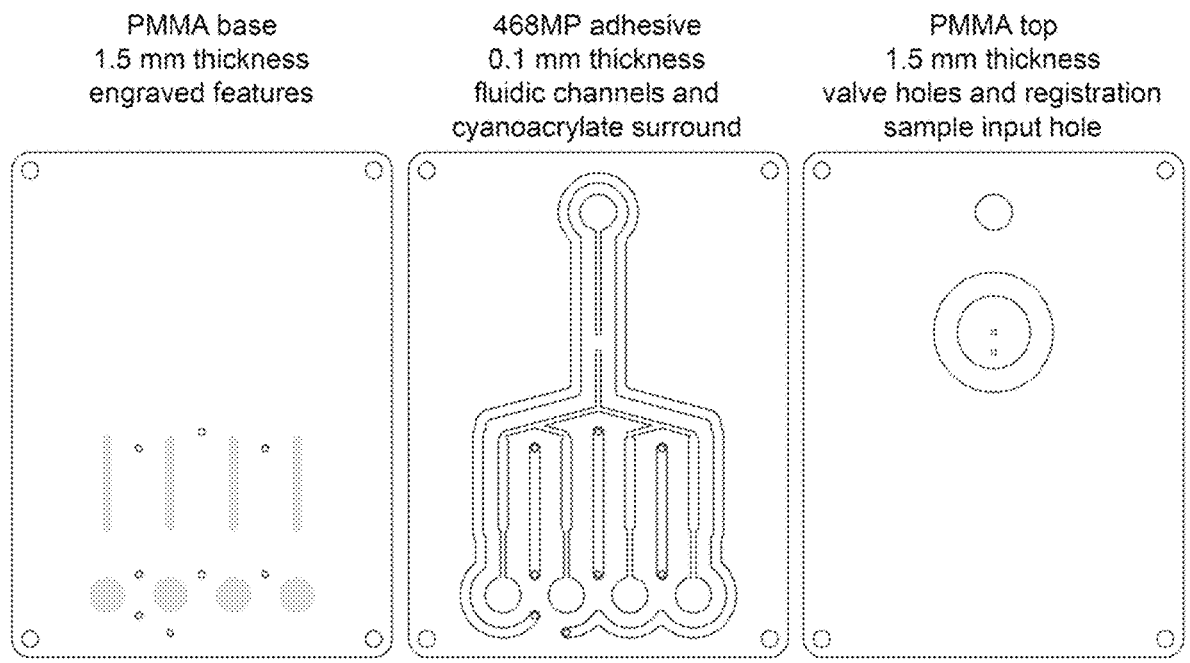
FIG. 15A-15B provides schematics of an exemplary RT-LAMP chip. Solid lines indicate cutting (e.g., a thru cut, a deeper feature, a surface etch, or a cut), and shaded areas indicate engraving.
Figure 15B:
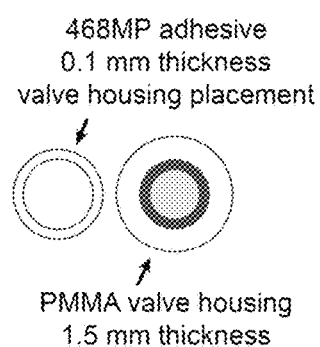

We prototyped chips from 2 layers of laser-etched PMMA and a single layer of laser-cut acrylic adhesive (FIG. 14A), and used them to detect WNV RNA with isothermal amplification (FIG. 14B-14C). Schematics for the chip are provided in FIG. 15A-15B. Nath et al. previously reported laser-cut microfluidic chips assembled with pressure sensitive adhesives, including chips that successfully conduct polymerase chain reaction, and showed that leachate from laser cut acrylic adhesives inhibited PCR (see, e.g., Nath P et al., "Rapid prototyping of robust and versatile microfluidic components using adhesive transfer tapes," *Lab Chip* 2010; 10:2286-91; and Nath P et al., "Polymerase chain reaction compatibility of adhesive transfer tape based microfluidic platforms," *Microsys. Technol.* 2014; 20(6): 1187-93)

We found that the enzymes used in RT-LAMP tolerated acrylic adhesives, and that QUASR provided a reliable endpoint signal for the reaction. In our experience, nonspecific calcein and SYTO dye detection methods failed in the presence of acrylic adhesives. The devices were pre-filled with dried reagents, including on-board positive and negative controls.

Dry-stabilized QUASR RT-LAMP reagents showed minimal loss in activity in accelerated aging tests at sustained temperatures of 45° C. for at least 2 weeks, or 60° C. for one week. Other reports have demonstrated similarly stabilized LAMP reagents by air drying with trehalose or lyophilization (see, e.g., Hayashida K et al., "Direct blood dry LAMP: a rapid, stable, and easy diagnostic tool for Human African Trypanosomiasis," *PLoS Negl. Trop. Dis.* 2015; 9(3): e0003578; and Chen H W et al., "The development of lyophilized loop-mediated isothermal amplification reagents for the detection of *Coxiella burnetii*," *J. Vis. Exp.* 2016; 110: e53839). We added a rehydration buffer and target WNV RNA to an integrated polypropylene tube sample holder, and replaced the tube's cap, which were modified to have a finger-actuated pump (the bulb from a squeeze pipette). We filled the chip by squeezing the pipette bulb, which causes the channels to fully fill with around 200 kPa of applied pressure. A check valve with a laser-engraved headspace sealed off the reaction channels after filling.

As expected for QUASR, only the lane with no quenching probe fluoresced when rehydrated (FIG. 14B). Chips were then placed on a heat plate at 65° C. for 30 minutes for nucleic acid amplification to occur. Upon heating above the melting temperature of the quenching probe, all channels fluoresced red under green illumination (FIG. 14B). Upon cooling to room temperature, an LED and camera fitted with excitation and emission filters were used to visualize positive amplification (positive reactions remain bright when cool). These devices accurately and reliably detected WNV using endpoint detection (FIG. 14C), and prevented contamination of the lab space with amplicon. The use of the passive, normally closed check valves enabled a single actuation step (pressurizing the sample fluid) to fill the chip, seal the chip, and minimize evaporation under heating.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A fluidic cartridge comprising:
  a first fluidic check valve comprising:
    a base comprising an inlet;
    an elastomeric pad comprising a first surface and a second surface that opposes the first surface, wherein the first surface is configured to releasably contact the inlet;
    a pre-stressed spring comprising a plurality of extended beams defined within a planar substrate and connected to a central support, wherein a surface portion of the substrate is configured to contact a surface portion of the base, and wherein the central support is defined within the substrate and configured to align with the second surface of the elastomeric pad, thereby providing a pressurized seal between the inlet of the base, the elastomeric pad, and the central support of the pre-stressed spring; and
    a lid comprising a cavity, wherein the cavity is configured to encompass the pre-stressed spring and the elastomeric pad;
  a first valve seat configured to accommodate the first check valve; and
  a main microchannel in fluidic communication with the first valve seat.

2. The cartridge of claim 1, further comprising a diaphragm pump in fluidic communication with the first check valve.

3. The cartridge of claim 2, further comprising a second fluidic check valve in fluidic communication with the main microchannel.

4. The cartridge of claim 1, further comprising a chamber in fluidic communication with the first valve seat, wherein opening of the first check valve provides fluidic communication from the chamber to the main microchannel.

5. The cartridge of claim 1, further comprising one or more reaction channels in fluidic communication with the main microchannel and an air pocket having a dead-end that is in fluidic communication with the one or more reaction channels, thereby facilitating dead-end filling of the cartridge.

6. The cartridge of claim 5, further comprising a backflow channel in fluidic communication with the main microchannel and the air pocket.

7. A fluidic cartridge comprising:
an input channel configured to deliver a sample;
a pumping chamber in fluidic communication with an on-chip diaphragm pump; a first fluidic check valve comprising:
  a first base comprising an inlet;
  a first elastomeric pad comprising a first surface and a second surface that opposes the first surface, wherein the first surface is configured to releasably contact the inlet;
  a first pre-stressed spring comprising a plurality of extended beams defined within a planar substrate and connected to a central support, wherein a surface portion of the substrate is configured to contact a surface portion of the first base, and wherein the central support is defined within the substrate and configured to align with the second surface of the first elastomeric pad, thereby providing a pressurized seal between the inlet of the first base, the first elastomeric pad, and the central support of the first pre-stressed spring; and
  a first lid comprising a cavity, wherein the cavity is configured to encompass the first pre-stressed spring and the first elastomeric pad, wherein opening of the first check valve provides fluidic communication from the input channel to the pumping chamber;
a reaction channel;
a second fluidic check valve comprising:
  a second base comprising an inlet;
  a second elastomeric pad comprising a first surface and a second surface that opposes the first surface, wherein the first surface is configured to releasably contact the inlet;
  a second pre-stressed spring comprising a plurality of extended beams defined within a planar substrate and connected to a central support, wherein a surface portion of the substrate is configured to contact a surface portion of the second base, and wherein the central support is defined within the substrate and configured to align with the second surface of the second elastomeric pad, thereby providing a pressurized seal between the inlet of the second base, the second elastomeric pad, and the central support of the second pre-stressed spring; and
  a second lid comprising a cavity, wherein the cavity is configured to encompass the second pre-stressed spring and the second elastomeric pad, wherein opening of the second check valve provides fluidic communication from the pumping chamber to the reaction channel.

8. The cartridge of claim 1, wherein the base further comprises an outlet configured to be in fluidic communication with the inlet upon displacement of the elastomeric pad away from the inlet.

9. The cartridge of claim 1, further comprising:
a channel layer disposed between the planar substrate and the lid, wherein the channel layer comprises a chamber configured to accommodate a dimension the pre-stressed spring and a channel output configured to be in fluidic communication with the inlet upon displacement of the elastomeric pad away from the inlet.

10. The cartridge of claim 1, wherein the elastomeric pad and the pre-stressed spring comprises a single structure.

11. The cartridge of claim 1, wherein the base further comprises a ridge surrounding the inlet.

12. The cartridge of claim 11, wherein the elastomeric pad further comprises an indent configured to accommodate the ridge, thereby providing a seal between the ridge and the indent.

13. The cartridge of claim 1, wherein the base further comprises a recess configured to accommodate the planar substrate of the pre-stressed spring.

14. The cartridge of claim 1, wherein the lid is further configured to contact a surface portion of the base.

15. The cartridge of claim 1, wherein the cavity is configured to provide a conformal surface in proximity to a surface profile of the pre-stressed spring.

16. The cartridge of claim 1, in which the first fluidic check valve is a microfluidic check valve and/or a normally closed check valve.

17. The cartridge of claim 1, further comprising an adhesive layer disposed between the base and the planar substrate and/or between the planar substrate and the lid.

18. The cartridge of claim 1, wherein a first material for the planar substrate is different than a second material for the elastomeric pad.

19. The cartridge of claim 1, wherein the planar substrate comprises a laser-cut thermoplastic; and/or wherein the elastomeric pad comprises silicone.

20. The cartridge of claim 11, wherein the ridge is a concentric annular boss and wherein the elastomeric pad rests against the concentric annular boss over the inlet.

* * * * *